(12) United States Patent
Takahashi et al.

(10) Patent No.: US 11,074,881 B2
(45) Date of Patent: Jul. 27, 2021

(54) METHOD FOR DRIVING A DISPLAY DEVICE

(71) Applicant: Semiconductor Energy Laboratory Co., Ltd., Kanagawa-ken (JP)

(72) Inventors: Kei Takahashi, Kanagawa (JP); Susumu Kawashima, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 22 days.

(21) Appl. No.: 16/628,107

(22) PCT Filed: Jun. 22, 2018

(86) PCT No.: PCT/IB2018/054603
§ 371 (c)(1),
(2) Date: Jan. 2, 2020

(87) PCT Pub. No.: WO2019/008464
PCT Pub. Date: Jan. 10, 2019

(65) Prior Publication Data
US 2021/0150996 A1     May 20, 2021

(30) Foreign Application Priority Data
Jul. 7, 2017   (JP) .............................. JP2017-133408

(51) Int. Cl.
*G09G 3/36* (2006.01)
*G02F 1/133* (2006.01)
(Continued)

(52) U.S. Cl.
CPC ......... *G09G 3/3614* (2013.01); *G02F 1/1368* (2013.01); *G02F 1/13306* (2013.01);
(Continued)

(58) Field of Classification Search
CPC .. G09G 3/3614; G09G 3/3677; G09G 3/3688; G09G 2310/0202;
(Continued)

(56) References Cited

U.S. PATENT DOCUMENTS

| 8,836,688 B2 * | 9/2014 | Yamauchi ............ G09G 3/3618 345/211 |
| 8,847,866 B2 * | 9/2014 | Yamauchi ............ G09G 3/3648 345/90 |

(Continued)

FOREIGN PATENT DOCUMENTS

| CN | 001440514 A | 9/2003 |
| CN | 001532601 A | 9/2004 |

(Continued)

OTHER PUBLICATIONS

International Search Report re Application No. PCT/IB2018/054603, dated Dec. 18, 2018.
(Continued)

*Primary Examiner* — Vinh T Lam
(74) *Attorney, Agent, or Firm* — Husch Blackwell LLP

(57) ABSTRACT

A novel and highly convenient or reliable display panel is provided which includes a first driver circuit, a second driver circuit, a first scan line, a second scan line, and a first signal line. The first driver circuit supplies a selection signal. The second driver circuit supplies a predetermined voltage, first data using a voltage greater than or equal to the predetermined voltage, and second data using a voltage less than or equal to the predetermined voltage. The first scan line is selected in a first period. The second scan line adjacent to the first scan line is selected in a third period. The first signal line receives the first data in the first period, the predeter-
(Continued)

mined voltage in a second period, and the second data in the third period. The second period is provided between the first period and the third period.

13 Claims, 14 Drawing Sheets

(51) Int. Cl.
G02F 1/1345 (2006.01)
G02F 1/1362 (2006.01)
G02F 1/1368 (2006.01)

(52) U.S. Cl.
CPC .... G02F 1/13452 (2013.01); G02F 1/136286 (2013.01); G09G 3/3677 (2013.01); G09G 3/3688 (2013.01); G02F 2202/103 (2013.01); G09G 2310/0202 (2013.01); G09G 2320/0247 (2013.01); G09G 2330/021 (2013.01)

(58) Field of Classification Search
CPC ...... G09G 2320/0247; G09G 2330/021; G02F 1/13306; G02F 1/13452; G02F 1/136286; G02F 1/1368; G02F 2202/103
See application file for complete search history.

(56) References Cited

U.S. PATENT DOCUMENTS

| 8,854,292 | B2* | 10/2014 | Han | G09G 3/3677 |
| | | | | 345/100 |
| 9,082,356 | B2* | 7/2015 | Oh | G09G 3/3614 |
| 9,230,489 | B2* | 1/2016 | Yamazaki | G09G 3/342 |
| 9,370,075 | B2* | 6/2016 | Chaji | G09G 3/3291 |
| 9,536,491 | B2* | 1/2017 | Miyata | G09G 5/18 |
| 9,632,338 | B2* | 4/2017 | Nishida | G02F 1/13306 |
| 9,653,034 | B2* | 5/2017 | Cho | G09G 3/3688 |
| 9,721,505 | B2* | 8/2017 | Chaji | G09G 3/3233 |
| 10,453,404 | B2 | 10/2019 | Takahashi | |
| 2002/0180673 | A1 | 12/2002 | Tsuda et al. | |
| 2004/0183768 | A1 | 9/2004 | Yamato et al. | |
| 2008/0303771 | A1 | 12/2008 | Chen et al. | |
| 2010/0123832 | A1 | 5/2010 | Kitayama et al. | |
| 2011/0193846 | A1 | 8/2011 | Kimura et al. | |
| 2012/0162283 | A1* | 6/2012 | Miyairi | G09G 3/3413 |
| | | | | 345/690 |
| 2014/0152533 | A1 | 6/2014 | Imada | |
| 2014/0367673 | A1* | 12/2014 | Takahashi | G11C 11/24 |
| | | | | 257/43 |
| 2015/0310793 | A1* | 10/2015 | Kawashima | G06F 3/044 |
| | | | | 345/174 |
| 2017/0116946 | A1* | 4/2017 | Nakatani | G09G 3/3677 |
| 2018/0315388 | A1* | 11/2018 | Han | G09G 3/3677 |
| 2018/0357972 | A1* | 12/2018 | Wang | G09G 3/3688 |

FOREIGN PATENT DOCUMENTS

| CN | 101681610 A | 3/2010 |
| EP | 1 296 174 A1 | 3/2003 |
| EP | 2 161 712 A1 | 3/2010 |
| JP | 2004-287087 A | 10/2004 |
| JP | 2011-186450 A | 9/2011 |
| JP | 2014-130337 A | 7/2014 |
| KR | 10-0626795 B | 9/2006 |
| TW | 573167 B | 1/2004 |
| TW | 200421252 | 10/2004 |
| TW | 200849179 | 12/2008 |
| WO | WO 2001/084226 A1 | 11/2001 |
| WO | WO 2008/152857 A1 | 12/2008 |

OTHER PUBLICATIONS

Written Opinion re Application No. PCT/IB2018/054603, dated Dec. 18, 2018.

* cited by examiner

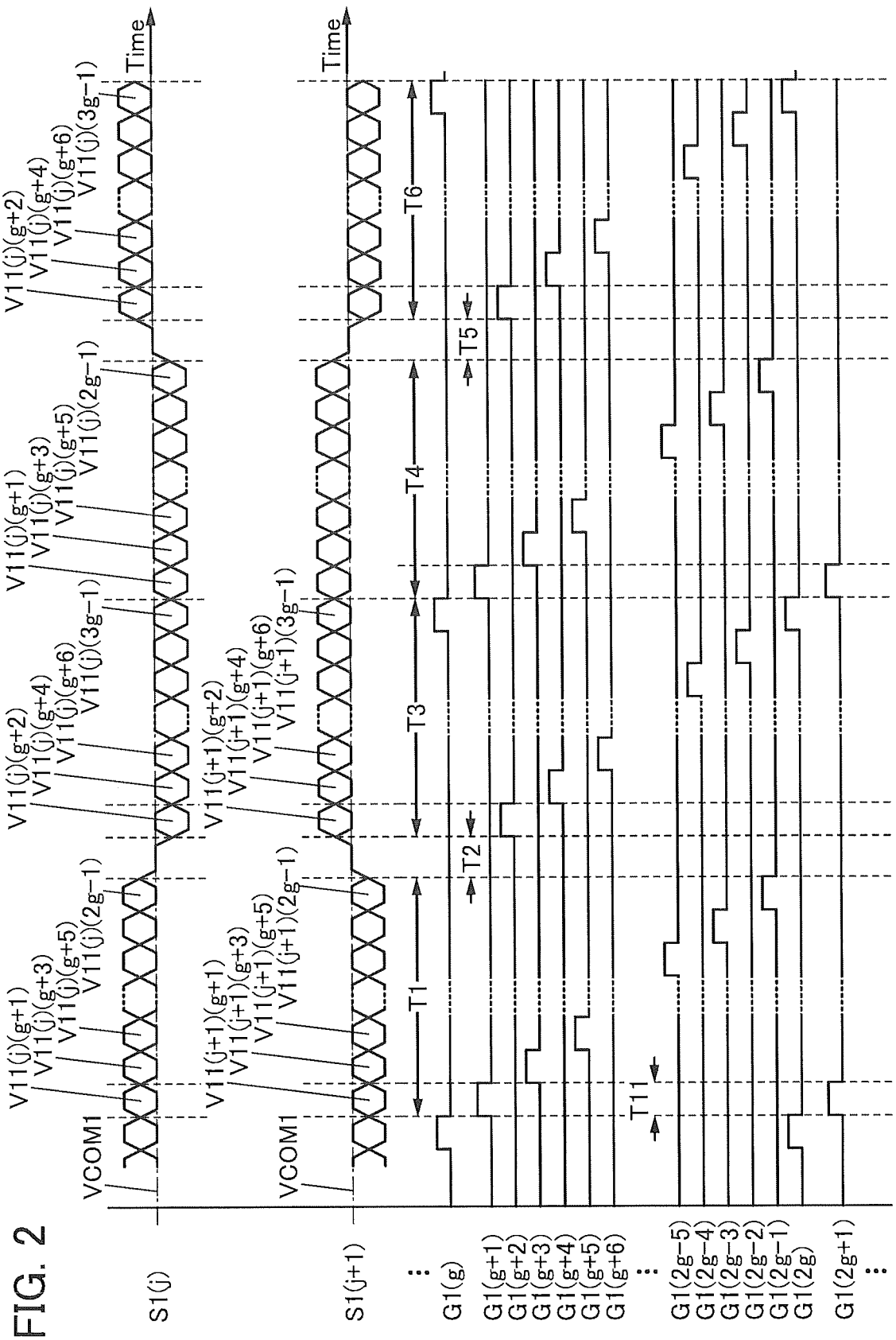

METHOD FOR DRIVING A DISPLAY DEVICE

This application is a 371 of international application PCT/IB2018/054603 filed on Jun. 22, 2018 which is incorporated herein by reference.

TECHNICAL FIELD

One embodiment of the present invention relates to a display panel, a display device, an input/output device, and a data processing device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method of driving any of them, and a method of manufacturing any of them.

BACKGROUND ART

A transistor including an oxide semiconductor with a low off-state current is used to form a circuit. A liquid crystal display device including, as the circuit, a precharge circuit or an inspection circuit in addition to a pixel circuit is known (Patent Document 1). Since an oxide semiconductor is used and the off-state current is low, there is little possibility of display failure due to signal or voltage leakage into the precharge circuit or the inspection circuit. Thus, a display device that performs accurate display can be provided.

REFERENCE

Patent Document

[Patent Document 1] Japanese Published Patent Application No. 2011-186450

DISCLOSURE OF INVENTION

An object of one embodiment of the present invention is to provide a novel display panel that is highly convenient or reliable. Another object of one embodiment of the present invention is to provide a novel display device that is highly convenient or reliable. Another object is to provide a novel input/output device that is highly convenient or reliable. Another object is to provide a novel data processing device that is highly convenient or reliable. Another object is to provide a novel display panel, a novel display device, a novel input/output device, a novel data processing device, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a display panel including a first driver circuit, a second driver circuit, a first scan line, a second scan line, and a first signal line.

The first driver circuit supplies a selection signal.

The second driver circuit supplies a predetermined voltage. The second driver circuit supplies first data with the use of a voltage greater than or equal to the predetermined voltage. The second driver circuit also supplies second data with the use of a voltage less than or equal to the predetermined voltage.

The first scan line is selected in a first period. The second scan line is selected in a third period and adjacent to the first scan line.

The first signal line receives the first data in the first period. The first signal line receives the predetermined voltage in a second period. The first signal line receives the second data in the third period.

The second period is provided between the first period and the third period.

Thus, the first data can be supplied using the voltage greater than or equal to the predetermined voltage in the first period, the second data can be supplied using the voltage less than or equal to the predetermined voltage in the third period, and a predetermined potential can be supplied in the second period provided between the first period and the third period.

The second data can be supplied using a voltage the polarity of which is different from that of the first data.

Before the voltage supplied to the first signal line is inverted, the predetermined voltage can be supplied to the first signal line. When the voltage supplied to the first signal line is inverted, a load on the second driver circuit can be dispersed in terms of time. When the voltage supplied to the first signal line is inverted, a shortfall in the drive capability of the second driver circuit can be prevented. For example, it is possible to reduce the effect of the voltage used to supply the first data right before polarity inversion on the voltage used to supply the second data right after the polarity inversion.

Consequently, a novel display panel that is highly convenient or reliable can be provided.

(2) Another embodiment of the present invention is the display panel including a control circuit.

The control circuit supplies a control signal.

The second driver circuit supplies the first data, the predetermined voltage, and the second data on the basis of the control signal.

The length of the second period is greater than 0 and less than or equal to twice the length of the period in which the first data is supplied.

This can make the voltage of the first signal line close to the predetermined voltage. In order that a shortfall in the drive capability of the second driver circuit be prevented, the period in which the first data is supplied can be reduced. Alternatively, the first period can be reduced. Consequently, a novel display panel that is highly convenient or reliable can be provided.

(3) Another embodiment of the present invention is the display panel in which the second driver circuit supplies third data with the use of the voltage less than or equal to the predetermined voltage and supplies fourth data with the use of the voltage greater than or equal to the predetermined voltage.

The first scan line is selected in a fourth period, and the second scan line is selected in a sixth period.

The first signal line receives the third data in the fourth period. The first signal line receives the predetermined voltage in a fifth period. The first signal line receives the fourth data in the sixth period.

The fourth period is provided right after the third period. The fifth period is provided between the fourth period and the sixth period.

Accordingly, the third data can be supplied using the voltage greater than or equal to the predetermined voltage in the fourth period, the fourth data can be supplied using the voltage less than or equal to the predetermined voltage in the sixth period, and the predetermined potential can be supplied in the fifth period provided between the fourth period and the sixth period.

The fourth data can be supplied using a voltage the polarity of which is different from that of the third data.

Before the voltage supplied to the first signal line is inverted, the predetermined voltage can be supplied to the first signal line. When the voltage supplied to the first signal line is inverted, a load on the second driver circuit can be dispersed in terms of time. When the voltage supplied to the first signal line is inverted, a shortfall in the drive capability of the second driver circuit can be prevented. For example, it is possible to reduce the effect of the voltage used to supply the first data right before polarity inversion on the voltage used to supply the second data right after the polarity inversion.

The third data can be supplied using a voltage having the same polarity as the second data. The third data supplied using the voltage having the same polarity as the second data can be supplied to the first signal line in succession to the second data. The time required for the supply of the predetermined voltage can be reduced.

Consequently, a novel display panel that is highly convenient or reliable can be provided.

(4) Another embodiment of the present invention is the display panel including a second signal line.

The second driver circuit supplies fifth data with the use of the voltage less than or equal to the predetermined voltage. The second driver circuit supplies sixth data with the use of the voltage greater than or equal to the predetermined voltage.

The second signal line is adjacent to the first signal line. The second signal line receives the fifth data in the first period. The second signal line receives the predetermined voltage in the second period. The second signal line receives the sixth data in the third period.

Accordingly, the fifth data can be supplied using the voltage less than or equal to the predetermined voltage in the first period, the sixth data can be supplied using the voltage greater than or equal to the predetermined voltage in the third period, and the predetermined potential can be supplied in the second period provided between the first period and the third period.

The sixth data can be supplied using a voltage the polarity of which is different from that of the fifth data.

Before the voltage supplied to the second signal line is inverted, the predetermined voltage can be supplied to the second signal line. When the voltage supplied to the second signal line is inverted, a load on the second driver circuit can be dispersed in terms of time. When the voltage supplied to the second signal line is inverted, a shortfall in the drive capability of the second driver circuit can be prevented. For example, it is possible to reduce the effect of the voltage used to supply the first data right before polarity inversion on the voltage used to supply the second data right after the polarity inversion.

The fifth data can be supplied to the second signal line in the first period with the use of a voltage the polarity of which is different from that of the first data supplied to the first signal line. The sixth data can be supplied to the second signal line in the third period with the use of a voltage the polarity of which is different from that of the second data supplied to the first signal line.

Consequently, a novel display panel that is highly convenient or reliable can be provided.

(5) Another embodiment of the present invention is the display panel including a first group of scan lines and a second group of scan lines.

The first group of scan lines includes the first scan line, and the second group of scan lines includes the second scan line.

The scan lines of the first group are selected sequentially one by one by the first driver circuit in the first period. The scan lines of the second group are selected sequentially one by one by the first driver circuit in the third period.

Accordingly, the scan lines of the second group can sequentially receive a selection signal in the third period different from the first period in which the scan lines of the first group sequentially receive a selection signal.

The scan lines of the second group, which are different from the scan lines of the first group which sequentially receive a selection signal in the first period, can sequentially receive a selection signal in the third period.

The second period in which the first driver circuit supplies no selection signal can be provided between the first period and the third period. The second period in which the second driver circuit supplies the predetermined voltage can be provided between the first period and the third period.

Consequently, a novel display panel that is highly convenient or reliable can be provided.

(6) Another embodiment of the present invention is the display panel including a display region.

The display region includes a first group of pixels, a second group of pixels, and a third group of pixels.

The first group of pixels is arranged in a row direction. The first group of pixels includes a first pixel. The first group of pixels is electrically connected to the first scan line.

The second group of pixels is arranged in the row direction. The second group of pixels includes a second pixel. The second group of pixels is electrically connected to the second scan line.

The third group of pixels is arranged in a column direction intersecting the row direction. The third group of pixels includes the first pixel and the second pixel. The third group of pixels is electrically connected to the first signal line.

Accordingly, the second data can be supplied to the pixels without deteriorating right after polarity inversion. The number of pixels of the third group electrically connected to the first signal line can be increased. Consequently, a novel display panel that is highly convenient or reliable can be provided.

(7) Another embodiment of the present invention is the display panel in which the pixel includes a functional layer and a display element.

The functional layer includes a pixel circuit. The pixel circuit is electrically connected to the display element. The display element includes a layer including a liquid crystal material.

Accordingly, electric fields with inverse polarities can be applied to the layer including a liquid crystal material. An irreversible change in the display characteristics of the display element can be suppressed. Burn-in of the display element can be prevented. With the use of a transistor having low current drive capability in the pixel circuit, electric fields with inverse polarities can be applied to the layer including a liquid crystal material. Consequently, a novel display panel that is highly convenient or reliable can be provided.

(8) Another embodiment of the present invention is the display panel in which the pixel circuit includes a transistor, the transistor includes a semiconductor, and the semiconductor includes hydrogenated amorphous silicon.

Thus, for example, a transistor including hydrogenated amorphous silicon can be used for the pixel circuit. The second data can be supplied to the pixels without deteriorating right after polarity inversion. The number of pixels of the third group electrically connected to the first signal line can be increased. Consequently, a novel display panel that is highly convenient or reliable can be provided.

(9) Another embodiment of the present invention is the display panel in which the first scan line is selected at a frequency less than or equal to 1 Hz or greater than or equal to 30 Hz.

The second scan line is selected at the same frequency as the first scan line. The pixel circuit includes a transistor. The transistor includes a semiconductor. The semiconductor includes an oxide semiconductor.

Thus, flickering can be suppressed. Power consumption can be reduced. A moving image that moves fast can be displayed smoothly. A photograph and the like can be displayed in a large number of gray levels. Consequently, a novel display panel that is highly convenient or reliable can be provided.

(10) Another embodiment of the present invention is a display device including the above display panel and a control portion.

The control portion receives image data and control data. The control portion generates data on the basis of the image data. The control portion supplies the data.

The display panel receives the data and the pixel performs display on the basis of the data.

Thus, the image data can be displayed using the display element. Consequently, a novel display device that is highly convenient or reliable can be provided.

(11) Another embodiment of the present invention is an input/output device including an input portion and a display portion.

The display portion includes the above display panel.

The input portion includes a sensing region and senses an object approaching the sensing region.

The sensing region includes a region overlapping with the pixel.

With such a structure, an object approaching the region overlapping with the display portion can be sensed while the image data is displayed using the display portion. A finger or the like that approaches the display portion can be used as a pointer to input positional data.

Positional data can be associated with the image data displayed on the display portion. Consequently, a novel input/output device that is highly convenient or reliable can be provided

(12) Another embodiment of the present invention is a data processing device including any of the above display panels and one or more of a keyboard, a hardware button, a pointing device, a touch sensor, an illuminance sensor, an imaging device, an audio input device, a sight input device, and an attitude detection device.

Thus, an arithmetic device can generate image data or control data on the basis of data supplied using a variety of input devices. Consequently, a novel data processing device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, a potential, or voltage can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel display panel that is highly convenient or reliable can be provided. A novel display device that is highly convenient or reliable can be provided. A novel input/output device that is highly convenient or reliable can be provided. A novel data processing device that is highly convenient or reliable can be provided. A novel display panel, a novel display device, a novel input/output device, a novel data processing device, or a novel semiconductor device can be provided.

Note that the description of these effects does not preclude the existence of other effects. One embodiment of the present invention does not necessarily achieve all the effects listed above.

Other effects will be apparent from and can be derived from the description of the specification, the drawings, the claims, and the like.

BRIEF DESCRIPTION OF DRAWINGS

FIG. 2 is a timing chart illustrating an operation of a display panel of an embodiment.

FIGS. 7A, 7B1, 7B2, and 7B3 illustrate structures of a display device of an embodiment.

BEST MODE FOR CARRYING OUT THE INVENTION

Figure 1:
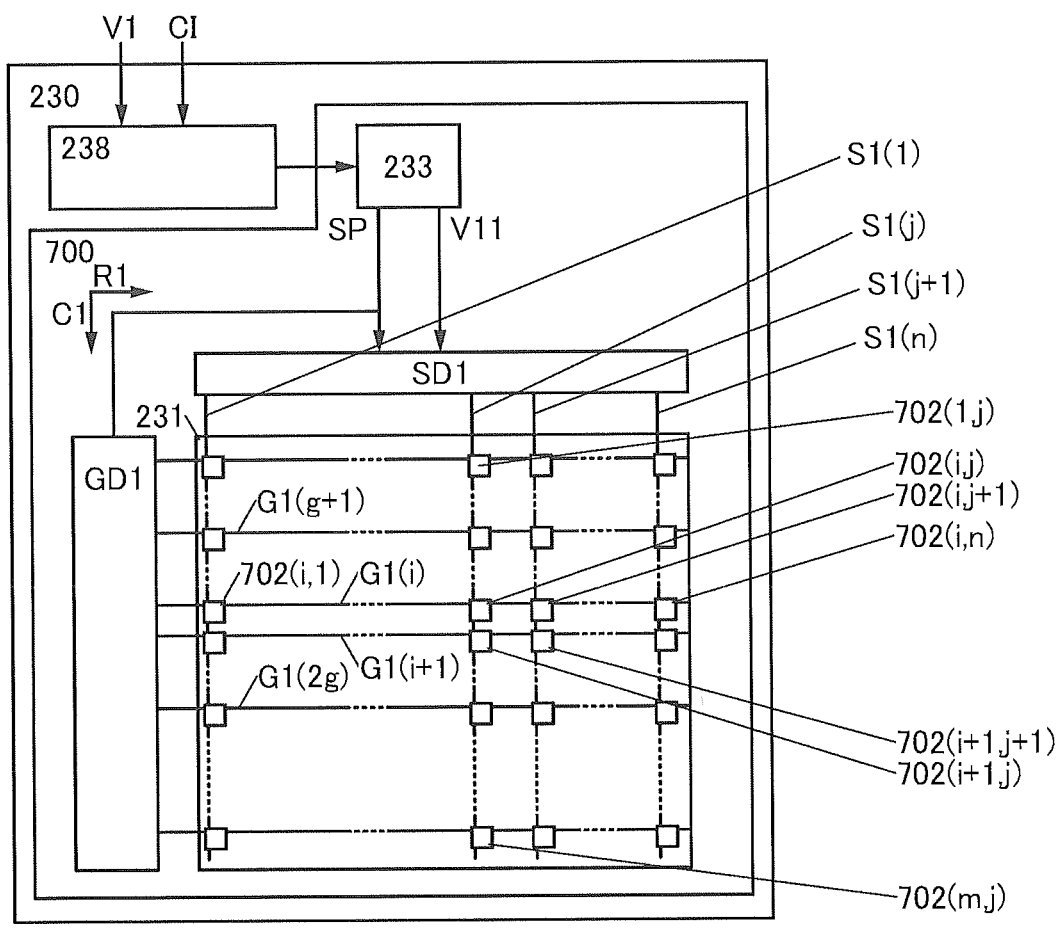
FIG. 1 is a block diagram illustrating a display panel of an embodiment.

A display panel of one embodiment of the present invention includes a first driver circuit, a second driver circuit, a first scan line, a second scan line, and a first signal line. The first driver circuit supplies a selection signal.

The second driver circuit supplies a predetermined voltage. The second driver circuit supplies first data with the use of a voltage greater than or equal to the predetermined voltage. The second driver circuit also supplies second data with the use of a voltage less than or equal to the predetermined voltage.

The first scan line is selected in a first period. The second scan line is selected in a third period and adjacent to the first scan line.

The first signal line receives the first data in the first period. The first signal line receives the predetermined voltage in a second period. The first signal line receives the second data in the third period. The second period is provided between the first period and the third period.

Accordingly, the first data can be supplied using the voltage greater than or equal to the predetermined voltage in the first period, the second data can be supplied using the voltage less than or equal to the predetermined voltage in the third period, and a predetermined potential can be supplied in the second period provided between the first period and the third period.

The second data can be supplied using a voltage the polarity of which is different from that of the first data.

Before the voltage supplied to the first signal line is inverted, the predetermined voltage can be supplied to the first signal line. When the voltage supplied to the first signal line is inverted, a load on the second driver circuit can be dispersed in terms of time. When the voltage supplied to the first signal line is inverted, a shortfall in the drive capability of the second driver circuit can be prevented. For example, it is possible to reduce the effect of the voltage used to supply the first data right before polarity inversion on the voltage used to supply the second data right after the polarity inversion.

Consequently, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments. Note that in structures of the present invention described below, the same portions or portions having similar functions are denoted by the same reference numerals in different drawings, and a description thereof is not repeated.

Embodiment 1

In this embodiment, a structure of a display panel of one embodiment of the present invention is described with reference to FIG. 1, FIG. 2, and FIGS. 3A and 3B.

FIG. 1 is a block diagram illustrating a structure of the display panel of one embodiment of the present invention.

Figure 7A:
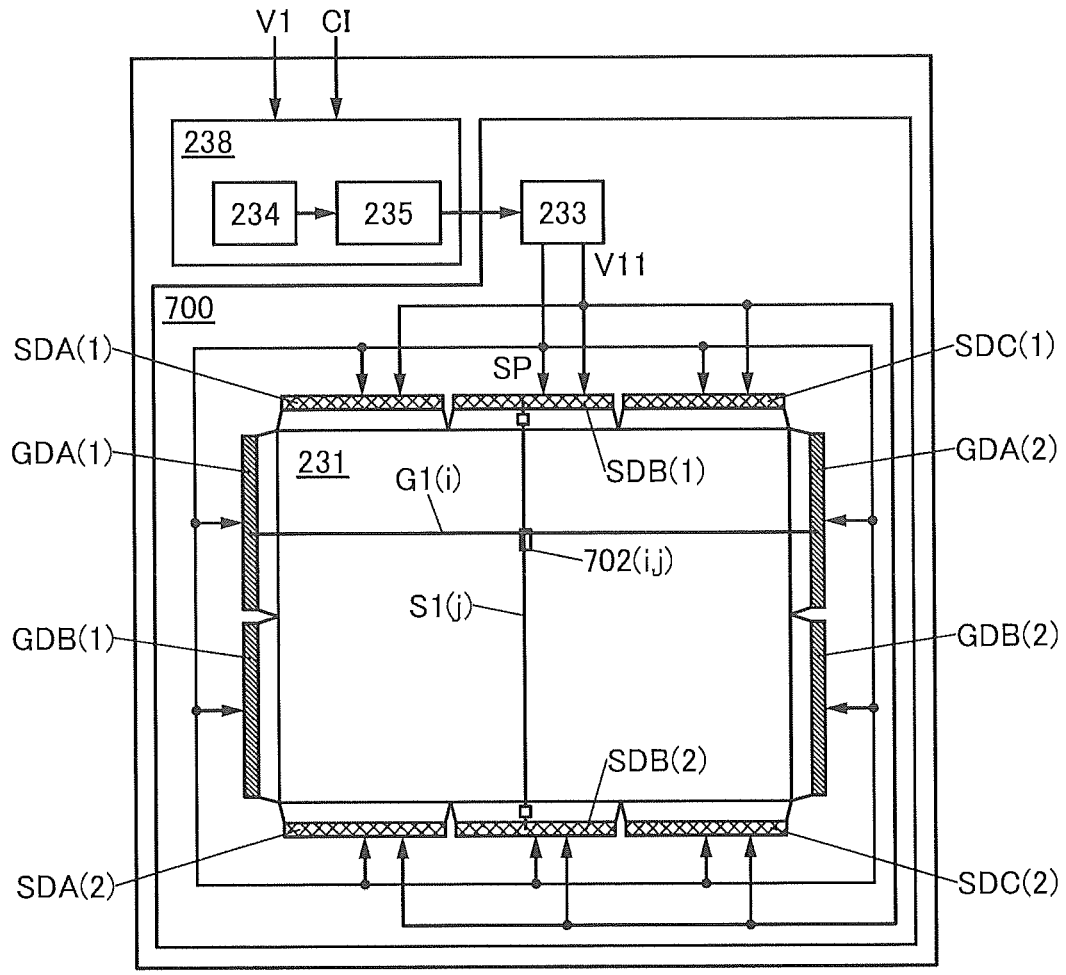
Figures 1, 7B:
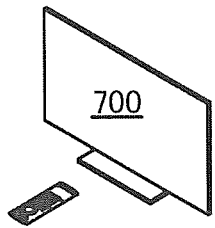
Figures 2, 7B:
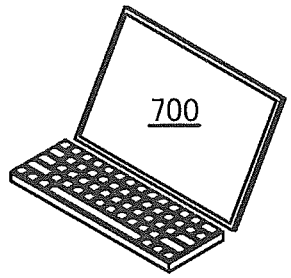
Figures 3, 7B:
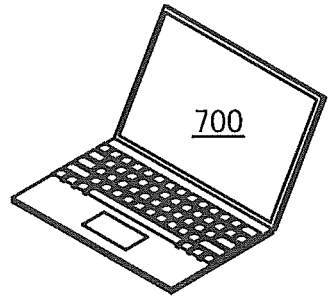

FIG. 2 is a timing chart showing an operation of the display panel of one embodiment of the present invention.

Figure 3A:
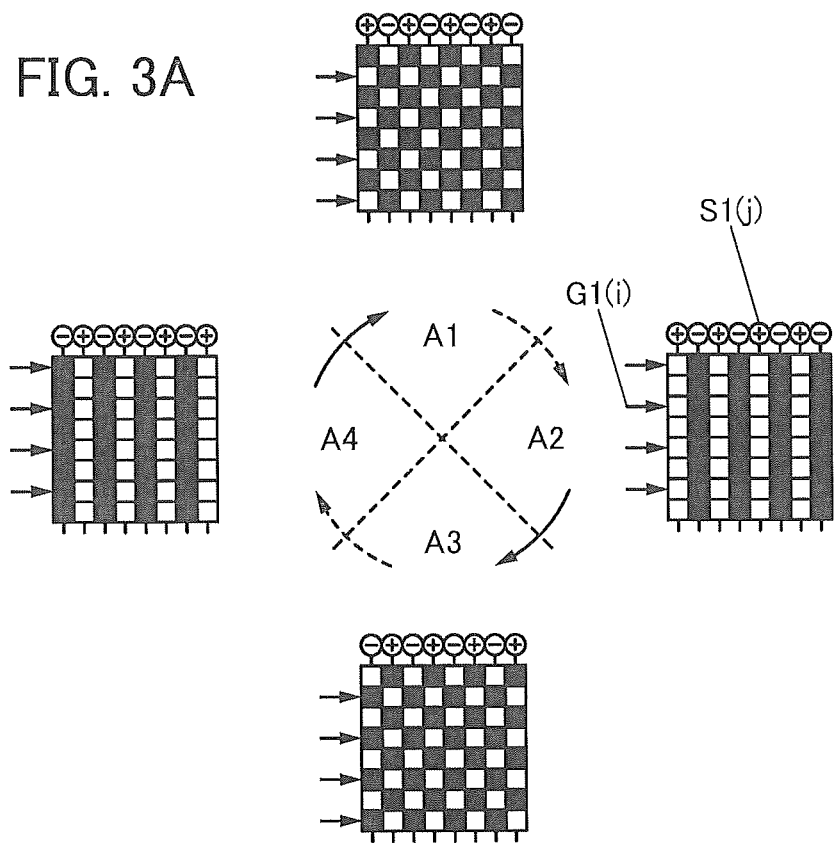
FIGS. 3A and 3B are schematic views illustrating operations of a display panel of an embodiment.
Figure 3B:
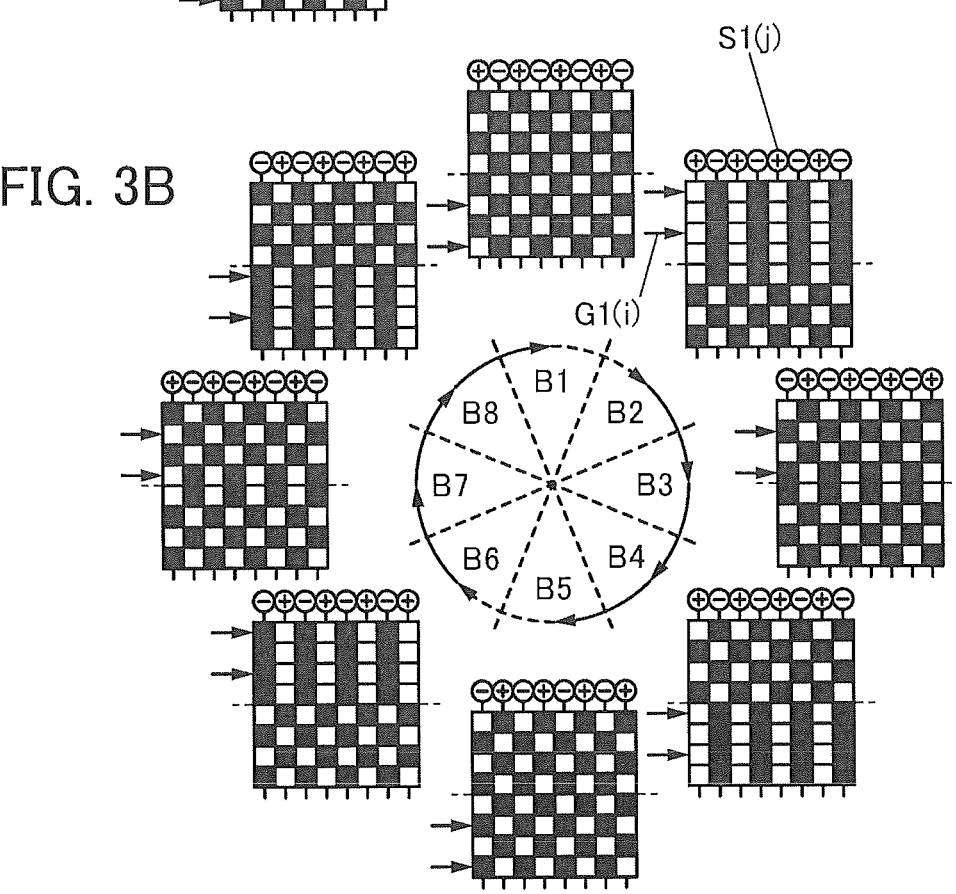

FIGS. 3A and 3B are schematic views illustrating operations of the display panel of one embodiment of the present invention. FIG. 3A is a schematic view illustrating an operation of the display panel of one embodiment of the present invention, and FIG. 3B is a schematic view illustrating an operation different from the operation in FIG. 3A.

Note that in this specification, an integer variable of 1 or more may be used for reference numerals. For example, "(p)" where p is an integer variable of 1 or more may be used for part of a reference numeral that specifies any one of components (p components at a maximum). For another example, "(in, n)" where each of in and n is an integer variable of 1 or more may be used for part of a reference numeral that specifies any one of components (m×n components at a maximum).

<Structure Example 1 of Display Panel>

A display panel 700 described in this embodiment includes a driver circuit GD1, a driver circuit SD1, a scan line G1($i$), a scan line G1($i$+1), and a signal line S1($j$) (see FIG. 1). Note that the scan line G1($i$) and the scan line G1($i$+1) are included in a group of scan lines G1($g$+1) to G1($2g$). Note that for example, i is an integer greater than or equal to 1 and less than or equal to (m−1), j is an integer greater than or equal to 1 and less than or equal to (n−1), and each of in and n is an integer greater than or equal to 1. For example, g is an integer greater than or equal to 1 and less than or equal to (m/2).

<<Structure example 1 of driver circuit GD1>>

The driver circuit GD1 supplies a selection signal. For example, a rectangular wave can be used as the selection signal. Specifically, FIG. 2 shows waveforms of selection signals supplied to scan lines G1($g$) to G1($2g$+1).

For example, the driver circuit GD1 has a function of supplying the selection signal to one scan line at a frequency of 30 Hz or more, preferably 60 Hz or more, on the basis of a control signal SP. Accordingly, a moving image can be smoothly displayed.

For example, the driver circuit GD1 has a function of supplying a selection signal to one scan line at a frequency less than 30 Hz, preferably less than 1 Hz, more preferably less than once per minute, on the basis of the control signal SP. Accordingly, a still image can be displayed with suppressed flickering.

Thus, flickering can be suppressed. Power consumption can be reduced. A moving image that moves fast can be displayed smoothly. A photograph and the like can be displayed in a large number of gray levels. Consequently, a novel display panel that is highly convenient or reliable can be provided.

<<Structure Example 1 of Driver Circuit SD1>>

The driver circuit SD1 supplies a predetermined voltage VCOM1.

The driver circuit SD1 supplies first data with the use of a voltage greater than or equal to the predetermined voltage VCOM1. For example, a signal V11($j$)(g+1) includes the first data.

The driver circuit SD1 supplies second data with the use of a voltage less than or equal to the predetermined voltage VCOM1. For example, a signal V11 ($j$)(g+2) includes the second data. It can be said that the polarity of the second data is inverted from that of the first data.

The driver circuit SD1 has a function of supplying an image signal on the basis of data V11.

The driver circuit SD1 has a function of generating the image signal and supplying the image signal to a pixel circuit electrically connected to one display element.

For example, any of a variety of sequential circuits, such as a shift register, can be used as the driver circuit SD1.

For example, an integrated circuit formed on a silicon substrate can be used as the driver circuit SD1.

An integrated circuit can be mounted on a terminal by a chip on glass (COG) method or a chip on film (COF) method, for example. Specifically, an anisotropic conductive film can be used to mount an integrated circuit on the terminal.

<<Structure Example 1 of Scan Lines G1($i$) and G1($i$+1)>>

The scan line G1($i$) is selected in a period T1. The scan line G1($i$+1) is selected in a period T3. Note that the scan line G1($i$+1) is adjacent to the scan line G1($i$) (see FIG. 1).

For example, the scan line G1(g+1) is selected in the period T1 and the scan line G1(g+2) is selected in the period T3 (see FIG. 2). The scan line G1(g+2) is adjacent to the scan line G1 (g+1).

<<Structure Example 1 of Signal Line S1($j$)>>

The first data is supplied to the signal line S1($j$) in the period T1. For example, the signal V11 ($j$)(g+1) including the first data is supplied in the period T1 (see FIG. 2).

The predetermined voltage VCOM1 is supplied to the signal line S1($j$) in a period T2.

The second data is supplied to the signal line S1($j$) in the period T3. For example, the signal V11($j$)(g+2) including the second data is supplied in the period T3.

<<Periods T1, T2, and T3>>

The period T2 is provided between the periods T1 and T3. In other words, the period T2 is provided between the periods T1 and T3 and the polarity is inverted in the period T2. For example, a state A2 is a schematic view illustrating the state in the end of the period T1 and a state A3 is a schematic view illustrating the state in the end of the period T3 (see FIG. 3A). For example, a state B2 is a schematic view illustrating the state in the end of the period T1 and a state B3 is a schematic view illustrating the state in the end of the period T3 (see FIG. 3B).

Thus, the first data can be supplied using the voltage greater than or equal to the predetermined voltage VCOM1 in the period T1, the second data can be supplied using the voltage less than or equal to the predetermined voltage VCOM1 in the period T3, and a predetermined potential can be supplied in the period T2 provided between the period T1 and the period T3. The second data can be supplied using a voltage the polarity of which is different from that of the first data. Before the voltage supplied to the signal line S1($j$) is inverted, the predetermined voltage VCOM1 can be supplied to the signal line S1($j$). When the voltage supplied to the signal line S1($j$) is inverted, the load on the driver circuit SD1 can be dispersed in terms of time. When the voltage supplied to the signal line S1($j$) is inverted, a shortfall in the drive capability of the driver circuit SD1 can be prevented. For example, it is possible to reduce the effect of the voltage used to supply the first data right before polarity inversion on the voltage used to supply the second data right after the polarity inversion. Consequently, a novel display panel that is highly convenient or reliable can be provided.

<Structure Example 2 of Display Panel>

The display panel 700 includes a control circuit 233 (see FIG. 1).

<<Control Circuit 233>>

The control circuit 233 supplies the data V11 and the control signal SP.

For example, the data V11 includes image data.

The control circuit 233 has a function of supplying the control signal SP. For example, a clock signal, a timing signal, or the like can be used as the control signal SP. Specifically, a start pulse that starts an operation of the driver circuit GD1 or the driver circuit SD1 can be used as the control signal SP; operations of the driver circuits can thus be synchronized.

For example, a timing controller can be used as the control circuit 233.

For example, the control circuit 233 mounted on a rigid substrate can be used for the display panel. Note that the control circuit 233 mounted on the rigid substrate can be electrically connected to the driver circuit SD1 with the use of a flexible printed circuit.

<<Driver Circuit SD1>>

The driver circuit SD1 supplies the first data, the predetermined voltage VCOM, and the second data on the basis of the control signal SP. For example, the driver circuit SD1 supplies the signal V11($j$)(g+1) including the first data (see FIG. 2).

The length of the period T2 is greater than 0 and less than or equal to twice the length of a period T11 in which the first data is supplied, for example, greater than or equal to 0.4 times and less than or equal to the length of the period T11, and preferably, greater than or equal to 0.5 times and less than or equal to 0.8 times the length of the period T11.

This can make the voltage of the signal line S1($j$) close to the predetermined voltage VCOM. In order that a shortfall in the drive capability of the driver circuit SD1 be prevented, the period T11 in which the first data is supplied can be reduced. Alternatively, the period T1 can be reduced. Consequently, a novel display panel that is highly convenient or reliable can be provided.

<<Structure Example 2 of Driver Circuit SD1>>

The driver circuit SD1 supplies third data with the use of the voltage less than or equal to the predetermined voltage VCOM1. For example, the signal V11(j)(g+1) includes the third data (see FIG. 2).

The driver circuit SD1 supplies fourth data with the use of the voltage greater than or equal to the predetermined voltage VCOM1. For example, the signal V11(j)(g+1) includes the fourth data.

<<Structure Example 2 of Scan Line G1(i) and Scan Line G1(i+1)>>

The scan line G1(i) is selected in a period T4. The scan line G1(i+1) is selected in a period T6.

For example, the scan line G1(g+1) is selected in the period T4 and the scan line G1(g+2) is selected in the period T6 (see FIG. 2).

<<Structure Example 2 of Signal Line S1(j)>>

The third data is supplied to the signal line S1(j) in the period T4. For example, the signal V11(j)(g+1) including the third data is supplied in the period T4.

The predetermined voltage VCOM1 is supplied to the signal line S1(1) in a period T5.

The fourth data is supplied to the signal line S1(j) in a period T6. For example, the signal V11 (j)(g+2) including the fourth data is supplied in the period T6.

<<Periods T4, T5, and T6>>

The period T4 is provided right after the period T3 and the period T5 is provided between the periods T4 and T6. In other words, the polarity is not inverted between the periods T3 and T4. For example, a state A3 is a schematic view illustrating the state in the end of the period T3 and a state A4 is a schematic view illustrating the state in the end of the period T4 (see FIG. 3A). For example, a state B5 is a schematic view illustrating the state in the end of the period T3 and a state B6 is a schematic view illustrating the state in the end of the period T4 (see FIG. 3B).

Thus, the third data can be supplied using the voltage greater than or equal to the predetermined voltage VCOM1 in the period T4, the fourth data can be supplied using the voltage less than or equal to the predetermined voltage VCOM1 in the period T6, and the predetermined potential can be supplied in the period T5 provided between the period T4 and the period T6. The fourth data can be supplied using a voltage the polarity of which is different from that of the third data. Before the voltage supplied to the signal line S1(j) is inverted, the predetermined voltage VCOM1 can be supplied to the signal line S1(j). When the voltage supplied to the signal line S1(j) is inverted, the load on the driver circuit SD1 can be dispersed in terms of time. When the voltage supplied to the signal line S1(j) is inverted, a shortfall in the drive capability of the driver circuit SD1 can be prevented. The third data can be supplied using a voltage having the same polarity as the second data. The third data supplied using the voltage having the same polarity as the second data can be supplied to the signal line S1(j) in succession to the second data. The time required for the supply of the predetermined voltage VCOM1 can be reduced. Consequently, a novel display panel that is highly convenient or reliable can be provided.

<Structure Example 3 of Display Panel>

The display panel 700 also includes a signal line S1(j+1) (see FIG. 1).

The driver circuit SD1 supplies fifth data with the use of the voltage less than or equal to the predetermined voltage VCOM1 (see FIG. 2). For example, a signal V11(j+1)(g+1) includes the fifth data.

The driver circuit SD1 supplies sixth data with the use of the voltage greater than or equal to the predetermined voltage VCOM1. For example, a signal V11(j+1)(g+2) includes the sixth data. It can be said that the polarity of the sixth data is inverted from that of the first data.

<<Structure Example 1 of Signal Line S1(j+1)>>

The signal line S1(j+1) is adjacent to the signal line S1 (j).

The signal line S1(j+1) receives the fifth data in the period T1, receives the predetermined voltage VCOM1 in the period T2, and receives the sixth data in the period T3.

Accordingly, the fifth data can be supplied using the voltage less than or equal to the predetermined voltage VCOM1 in the period T1, the sixth data can be supplied using the voltage greater than or equal to the predetermined voltage VCOM1 in the period T3, and the predetermined potential can be supplied in the period T2 provided between the period T1 and the period T3.

The sixth data can be supplied using a voltage the polarity of which is different from that of the fifth data.

Before the voltage supplied to the signal line S1(j+1) is inverted, the predetermined voltage VCOM1 can be supplied to the signal line S1(j+1). When the voltage supplied to the signal line S1(j+1) is inverted, a load on the driver circuit SD1 can be dispersed in terms of time. When the voltage supplied to the signal line S1(j+1) is inverted, a shortfall in the drive capability of the driver circuit SD1 can be prevented. For example, it is possible to reduce the effect of the voltage used to supply the first data right before polarity inversion on the voltage used to supply the second data right after the polarity inversion.

The fifth data can be supplied to the signal line S1(j+1) in the period T1, using a voltage the polarity of which is different from that of the first data supplied to the signal line S1(j). The sixth data can be supplied to the signal line S1(j+1) in the period T3, using a voltage the polarity of which is different from that of the second data supplied to the signal line S1(j).

Consequently, a novel display panel that is highly convenient or reliable can be provided.

<Structure Example 4 of Display Panel>

The display panel 700 includes a first group of scan lines and a second group of scan lines.

The first group of scan lines includes the scan line G1(i) (see FIG. 1). For example, the scan lines G1(g+1) to G1(2g+1) can be used as the first group of scan lines (see FIG. 2). Specifically, the scan lines that are odd numbered from the scan line G1(g+1), such as the scan lines G1(g+1), G1(g+3), and G1 (g+5), can be used as the first group of scan lines.

The second group of scan lines includes the scan line G1 (i+1) (see FIG. 1). For example, the scan lines G1(g+2) to G1(2g) can be used as the second group of scan lines (see FIG. 2). Specifically, the scan lines that are even numbered from the scan line G1(g+1), such as the scan lines G1(g+2), G1(g+4), and G1(g+6), can be used as the second group of scan lines.

<<Structure Example 2 of Driver Circuit GD1>>

By the driver circuit GD1, the scan lines of the first group are selected sequentially one by one in the period T1 (see FIG. 2).

By the driver circuit GD1, the scan lines of the second group are selected sequentially one by one in the period T3 (see FIG. 2).

The scan lines of the second group can sequentially receive a selection signal in the period T3 different from the period T1 in which the scan lines of the first group sequentially receive a selection signal.

The scan lines of the second group, which are different from the scan lines of the first group which sequentially receive a selection signal in the period T1, can sequentially receive a selection signal in the period T3.

The period T2 in which the driver circuit SD1 supplies no selection signal can be provided between the periods T1 and T3. The period T2 in which the driver circuit SD1 supplies the predetermined voltage can be provided between the periods T1 and T3.

Consequently, a novel display panel that is highly convenient or reliable can be provided.

[Standard]

A so-called 8K television device or 8K television monitor has 4320 scan lines, 7680 signal lines, and a 120 Hz frame rate. In this case, the allowable period in which a selection signal is supplied to one scan line is as follows: $1/(120 \times 4320) \approx 1.92$ μs.

[Operation Example]

The period T11 in which the selection signal is supplied to one scan line is set to 1.9 μs (see FIG. 2). Note that the 1.9-μs period is shorter than the 1.92-μs allowable period by 0.02 μs.

For example, the 4320 scan lines are divided into 18 sets. The number of scan lines per set is 240.

The 120 odd-numbered scan lines of each set are regarded as the first group of scan lines. The 120 even-numbered scan lines of each set are regarded as the second group of scan lines.

In the case where the scan lines of the first group receive the selection signal one by one sequentially, the period T1 requires 228 μs (=1.9 μs×120) or more.

In addition, the period T2 in which the predetermined voltage VCOM1 is supplied to the signal lines is 2.4 μs.

In the case where the scan lines of the second group receive the selection signal one by one sequentially, the period T3 requires 228 μs (=1.9 μs×120) or more.

The sum of the periods T1 to T3 becomes 458.4 μs (=228 μs+2.4 μs+228 μs) or more. The result indicates that the period of time required to supply the selection signals to each set of scan lines is 458.4 μs or more.

The period of time required to supply the selection signals to all the 4320 scan lines divided into 18 sets, i.e., one frame period can be estimated at 8.2512 ms (=18×458.4 μs) or more.

In the case where the frame rate is 120 Hz, one frame period is 8.3333 ms. The 8.3333-ms period is longer than the above-described 8.2512-ms period. This indicates that the selection signals can be supplied to the 4320 scan lines at a 120 Hz frame rate by the above-described operation method.

<Structure Example 5 of Display Panel>

The display panel 700 also includes a display region 231 (see FIG. 1).

<<Display Region 231>>

The display region 231 includes a first group of pixels 702($i$, 1) to 702($i$, n), a second group of pixels 702($i$+1, 1) to 702($i$+1, n), and a third group of pixels 702 (1, j) to 702 ($m$, j).

<<Group of Pixels 702($i$, 1) to 702($i$, n)>>

The first group of pixels 702($i$, 1) to 702($i$, n) are provided in the row direction (the direction indicated by the arrow R1 in the drawing).

The first group of pixels 702($i$, 1) to 702($i$, n) include a first pixel 702($i$, j).

The first group of pixels 702($i$, 1) to 702($i$, n) are electrically connected to a scan line G1($j$).

<<Group of Pixels 702($i$+1, 1) to 702($i$+1, n)>>

The second group of pixels 702($i$+1, 1) to 702($i$+1, n) are provided in the row direction.

The second group of pixels 702($i$+1, 1) to 702($i$+1, n) include a second pixel 702($i$+1, j).

The second group of pixels 702($i$+1, 1) to 702($i$+1, n) are electrically connected to a scan line G1($i$+1).

<<Group of Pixels 702(1, j) to 702(1, n)>>

The third group of pixels 702(1, j) to 702(1, n) are provided in the column direction intersecting the row direction (the direction indicated by the arrow C1 in the drawing).

The third group of pixels 702(1, j) to 702(1, n) includes the first pixel 702($i$, j) and the second pixel 702($i$+1, j).

The third group of pixels 702(1, j) to 702(1, n) are electrically connected to the signal line S1($j$).

Accordingly, the second data can be supplied to the pixels without deteriorating right after polarity inversion. The number of pixels of the third group electrically connected to the signal line S1($j$) can be increased. Consequently, a novel display panel that is highly convenient or reliable can be provided.

Note that this embodiment can be combined with any of the other embodiments in this specification as appropriate.

Embodiment 2

In this embodiment, a structure of a display panel of one embodiment of the present invention is described with reference to FIGS. 4A to 4C, FIGS. 5A and 5B, and FIGS. 6A and 6B.

Figure 4A:
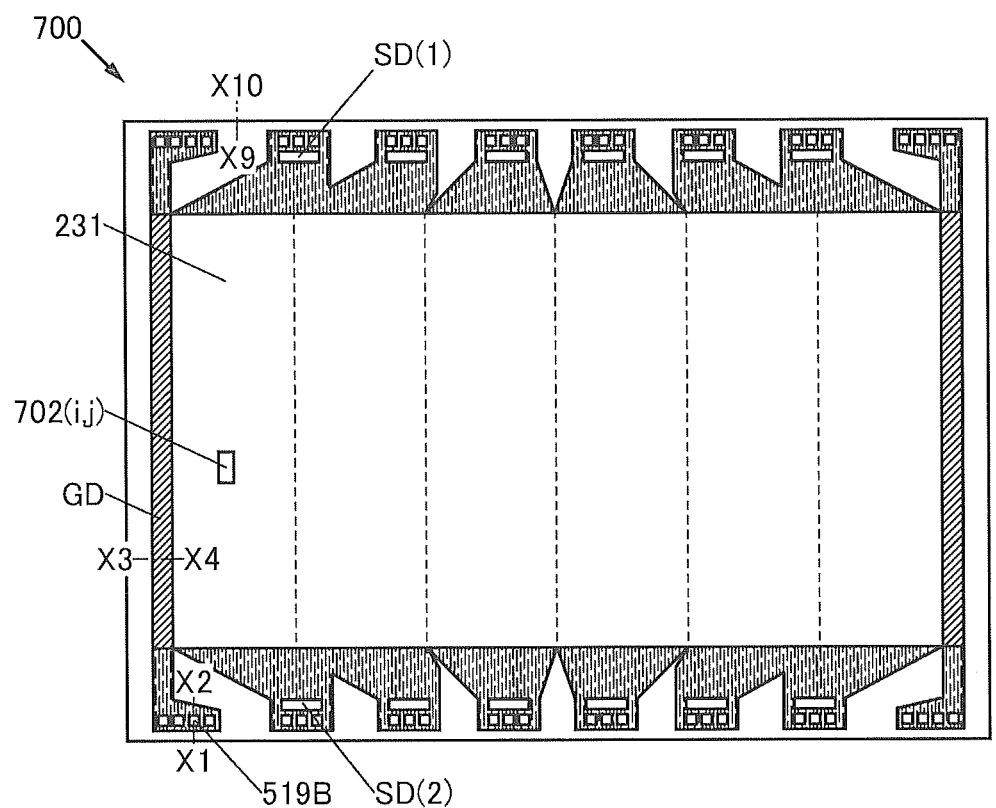
FIGS. 4A to 4C illustrate a structure of a display panel of an embodiment.
Figure 4B:
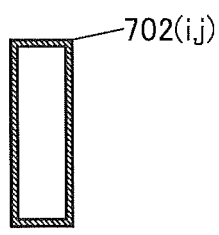
Figure 4C:
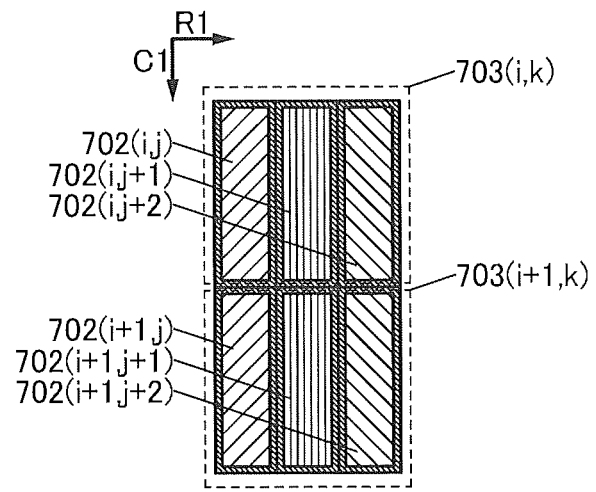

FIGS. 4A to 4C illustrate a structure of a display panel of one embodiment of the present invention. FIG. 4A is a top view of the display panel and FIGS. 4B and 4C are top views illustrating part of a pixel of the display panel in FIG. 4A.

Figure 5A:
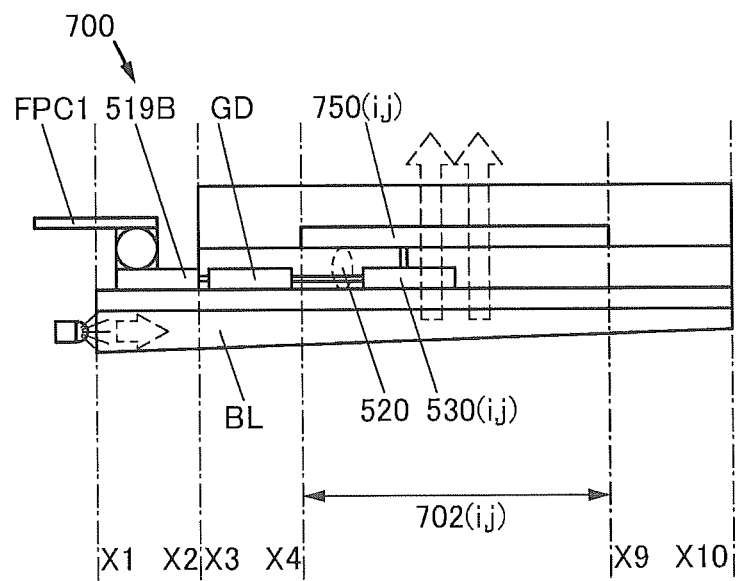
FIGS. 5A and 5B are a cross-sectional view and a circuit diagram illustrating a structure of a display panel of an embodiment.
Figure 5B:
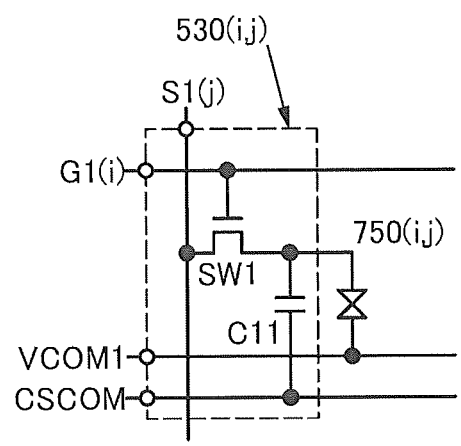

FIG. 5A is a cross-sectional view taken along the cutting lines X1-X2, X3-X4, and X9-X10 in FIG. 4A. FIG. 5B is a circuit diagram illustrating a structure of the pixel circuit included in the display panel of one embodiment of the present invention.

Figure 6A:
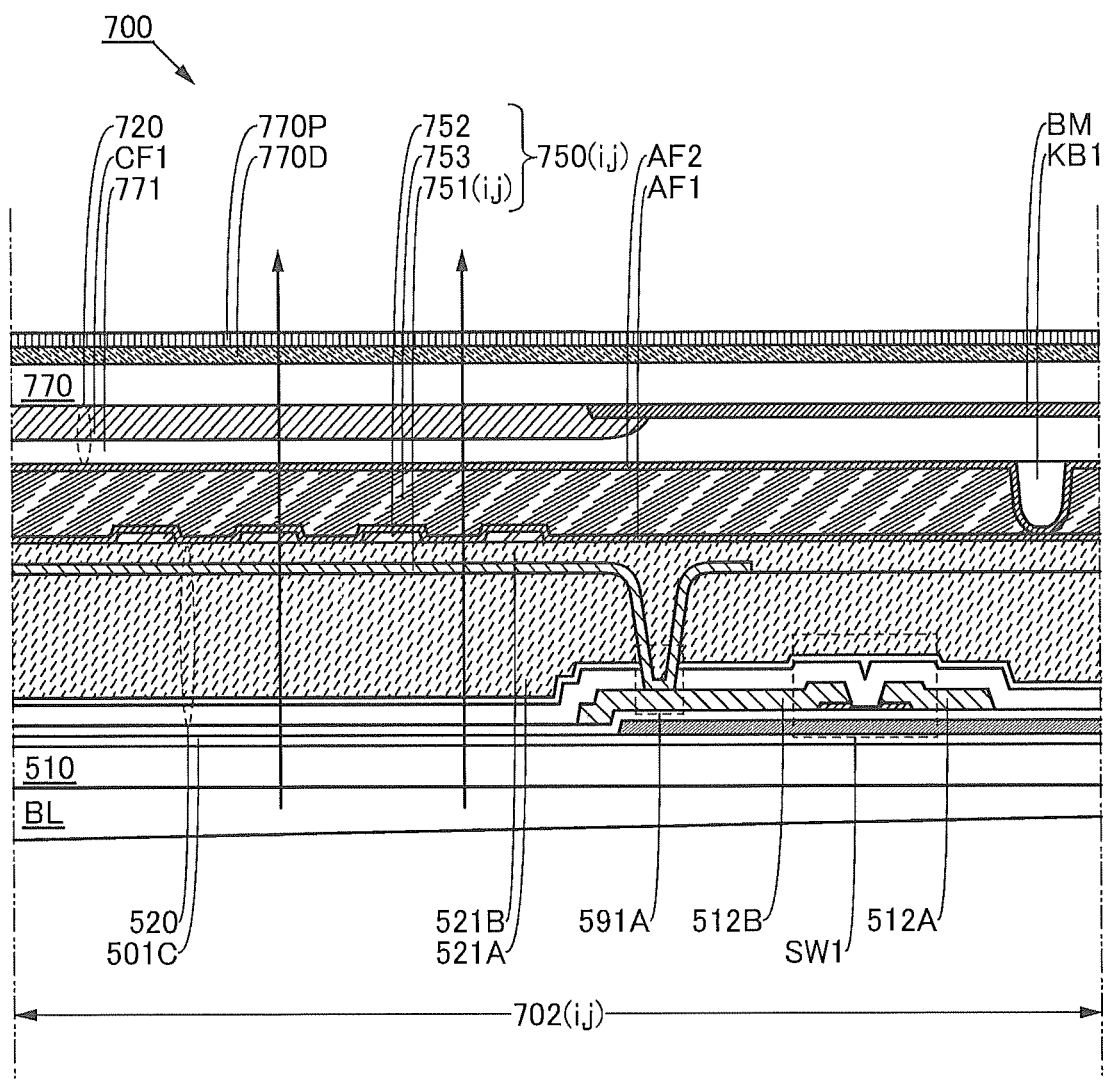
FIGS. 6A and 6B are cross-sectional views illustrating a structure of a pixel of an embodiment.
Figure 6B:
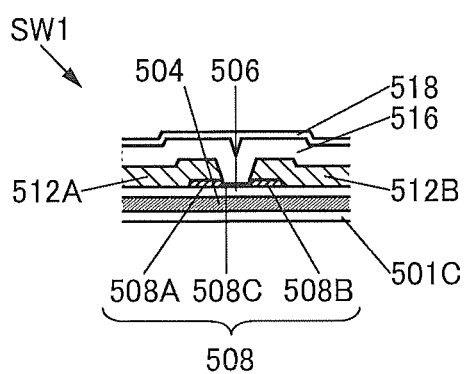

FIG. 6A illustrates a structure of the pixel of the display panel of one embodiment of the present invention. FIG. 6B is a cross-sectional view illustrating part of the pixel illustrated in FIG. 6A.

<Structure Example 6 of Display Panel>

The display panel 700 described in this embodiment includes a pixel 702($i$, j) (see FIG. 4A).

<<Structure Example 1 of Pixel 702($i$, j)>>

The pixel 702($i$, j) includes a functional layer 520 and a display element 750($i$, j) (see FIG. 5A).

<<Structure Example 1 of Functional Layer 520>>

The functional layer 520 includes a pixel circuit 530($i$, j).

<<Structure Example 1 of Pixel Circuit 530($i$, j)>>

The pixel circuit 530($i$, j) is electrically connected to the display element 750($i$, j) (see FIGS. 5A and 5B).

For example, the pixel circuit 530($i$, j) is electrically connected to the display element 750($i$, j) in an opening portion 591A (see FIG. 6A).

<<Structure Example 1 of Display Element 750>>

The display element 750($i$, j) has a function of controlling transmission or reflection of light. Specifically, a liquid crystal element can be used in combination with a polarizing plate. For example, a layer 753 including a liquid crystal material can be used for the liquid crystal element.

The display element 750($i$, j) includes the layer 753 including a liquid crystal material (see FIG. 6A).

Accordingly, electric fields with inverse polarities can be applied to the layer including a liquid crystal material. An irreversible change in the display characteristics of the display element can be suppressed. Burn-in of the display element can be prevented. With the use of a transistor having low current drive capability in the pixel circuit, electric fields with inverse polarities can be applied to the layer including a liquid crystal material. Consequently, a novel display panel that is highly convenient or reliable can be provided.

For example, a reflective liquid crystal element can be used as the display element 750($i, j$). The use of a reflective element can reduce the power consumption of the display panel.

For example, a transmissive liquid crystal display element can be used as the display element 750($i, j$). The display panel 700 has a function of controlling transmission of light from a backlight BL to display an image.

<<Structure Example of Liquid Crystal Element>>

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

The liquid crystal element used here can be driven also by a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode.

<<Structure Example 2 of Display Element 750($i, j$)>>

The display element 750($i, j$) includes an electrode 751($i, j$), an electrode 752, and the layer 753 including a liquid crystal material.

The electrode 751($i, j$) is electrically connected to the pixel circuit 530($i, j$) in the opening portion 591A.

The electrode 752 is provided such that an electric field that controls the alignment of the liquid crystal material is formed between the electrode 752 and the electrode 751($i, j$).

The display element 750($i, j$) includes an alignment film AF1 and an alignment film AF2.

<<Layer 753 Including Liquid Crystal Material>>

The layer 753 including a liquid crystal material includes a region between the alignment film AF1 and the alignment film AF2.

For example, a liquid crystal material having a resistivity greater than or equal to $1.0 \times 10^{13}$ Ω·cm, preferably greater than or equal to $1.0 \times 10^{14}$ Ω·cm, further preferably greater than or equal to $1.0 \times 10^{15}$ Ω·cm, is used for the layer 753 including a liquid crystal material. This can suppress a variation in the transmittance of the display element 750($i, j$). Furthermore, flickering of the display element 750($i, j$) can be suppressed. The rewriting frequency of the display element 750($i, j$) can also be reduced.

<<Structure Body KB1>>

A structure body KB1 has a function of providing a certain space between the functional layer 520 and the substrate 770.

<<Structure Example 2 of Pixel Circuit 530($i, j$)>>

The pixel circuit 530($i$, 1) includes a switch SW1. For example, a transistor can be used as the switch SW1.

<<Structure Example 1 of Switch SW1>>

The transistor used as the switch SW1 includes a semiconductor (see FIG. 6B).

The transistor includes a semiconductor film 508, a conductive film 504, a conductive film 512A, and a conductive film 512B (see FIG. 6B).

The semiconductor film 508 includes a region 508A electrically connected to the conductive film 512A and a region 508B electrically connected to the conductive film 512B. The semiconductor film 508 includes a region 508C between the region 508A and the region 508B.

The conductive film 504 includes a region overlapping with the region 508C and has a function of a gate electrode.

An insulating film 506 includes a region sandwiched between the semiconductor film 508 and the conductive film 504. The insulating film 506 has a function of a gate insulating film.

The conductive film 512A has one of a function of a source electrode and a function of a drain electrode, and the conductive film 512B has the other.

Note that, for example, semiconductor films formed in the same step can be used for transistors in the driver circuit and the pixel circuit.

As the transistor in the driver circuit or the pixel circuit, a bottom-gate transistor or a top-gate transistor can be used, for example.

<<Semiconductor Film 508>>

For example, a semiconductor including a Group 14 element can be used for the semiconductor film 508. Specifically, a semiconductor including silicon can be used for the semiconductor film 508.

For example, hydrogenated amorphous silicon can be used for the semiconductor film 508. Microcrystalline silicon or the like can also be used for the semiconductor film 508. Thus, a display panel having less display unevenness than a display panel using polysilicon for the semiconductor film 508, for example, can be provided. The size of the display panel can be easily increased.

Thus, for example, a transistor including hydrogenated amorphous silicon can be used for the pixel circuit. The second data can be supplied to the pixels without deteriorating right after polarity inversion. The number of pixels of the third group electrically connected to the signal line S1($j$) can be increased. Consequently, a novel display panel that is highly convenient or reliable can be provided.

For example, polysilicon can be used for the semiconductor film 508. In this case, for example, the field-effect mobility of the transistor can be higher than that of a transistor using hydrogenated amorphous silicon for the semiconductor film 508. For example, the drive capability can be higher than that of a transistor using hydrogenated amorphous silicon for the semiconductor film 508. For example, the aperture ratio of the pixel can be higher than that of a transistor using hydrogenated amorphous silicon for the semiconductor film 508.

The semiconductor film used for the transistor in the driver circuit can be formed in the same process as the semiconductor film used for the transistor in the pixel circuit. The driver circuit can be formed over the same substrate as the substrate over which the pixel circuit is formed. The number of components included in an electronic device can be reduced.

For example, the reliability of the transistor can be higher than that of a transistor using hydrogenated amorphous silicon for the semiconductor film 508.

The temperature required for manufacture of the transistor can be lower than that required for a transistor using single crystal silicon, for example.

For example, single crystal silicon can be used for the semiconductor film 508. In this case, for example, the resolution can be higher than that of a display panel using hydrogenated amorphous silicon for the semiconductor film 508. For example, a display panel having less display unevenness than a display panel using polysilicon for the semiconductor film 508, for example, can be provided. For example, smart glasses or a head mounted display can be provided.

For example, a compound semiconductor can be used as a semiconductor of the transistor. Specifically, a semiconductor including gallium arsenide can be used.

For example, an organic semiconductor can be used as a semiconductor of the transistor. Specifically, an organic semiconductor including any of polyacenes and graphene can be used for the semiconductor film.

<<Structure Example 3 of Scan Lines G1(*i*) and G1(*i*+1)>>

The scan line G1(*i*) is selected at a frequency less than or equal to 2 Hz or greater than or equal to 30 Hz, preferably less than or equal to 1 Hz or greater than or equal to 60 Hz. The scan line G1(*i*+1) is selected at the same frequency as the scan line G1(*i*).

The pixel circuit 530(*i*, *j*) includes the switch SW1. For example, a transistor can be used as the switch SW1.

<<Structure Example 2 of Switch SW1>>

The transistor used as the switch SW1 includes an oxide semiconductor (see FIG. 6B).

<<Structure Example 2 of Semiconductor Film 508>>

For example, a transistor using an oxide semiconductor can be used. Specifically, an oxide semiconductor including indium or an oxide semiconductor including indium, gallium, and zinc can be used for the semiconductor film.

For example, a transistor having a lower leakage current in an off state than a transistor that uses amorphous silicon for a semiconductor film can be used. Specifically, a transistor that uses an oxide semiconductor in a semiconductor film can be used.

Thus, a pixel circuit can hold an image signal for a longer time than a pixel circuit including a transistor that uses amorphous silicon for a semiconductor film. Specifically, the selection signal can be supplied at a frequency less than 30 Hz, preferably less than 1 Hz, more preferably less than once per minute while flickering is suppressed. Consequently, fatigue of a user of the data processing device can be reduced, and power consumption for driving can be reduced.

For example, a 25-nm-thick film including indium, gallium, and zinc can be used as the semiconductor film 508.

A conductive film in which a 10-nm-thick film including tantalum and nitrogen and a 300-nm-thick film including copper are stacked can be used as the conductive film 504, for example. A film including copper includes a region provided such that a film including tantalum and nitrogen is positioned between the film including copper and the insulating film 506.

For example, a stacked-layer film in which a 400-nm-thick film including silicon and nitrogen and a 200-nm-thick film including silicon, oxygen, and nitrogen are stacked can be used for the insulating film 506. Note that the film including silicon and nitrogen includes a region provided such that the film including silicon, oxygen, and nitrogen is positioned between the film including silicon and nitrogen and the semiconductor film 508.

For example, a conductive film in which a 50-nm-thick film including tungsten, a 400-nm-thick film including aluminum, and a 100-nm-thick film including titanium are stacked in this order can be used as the conductive film 512A or the conductive film 512B. Note that the film including tungsten includes a region in contact with the semiconductor film 508.

A manufacturing line for a bottom-gate transistor including amorphous silicon as a semiconductor can be easily remodeled into a manufacturing line for a bottom-gate transistor including an oxide semiconductor as a semiconductor, for example. For example, a manufacturing line for a top-gate transistor including polysilicon as a semiconductor can be easily remodeled into a manufacturing line for a top-gate transistor including an oxide semiconductor as a semiconductor. In any case, a conventional manufacturing line can be effectively used.

Thus, flickering can be suppressed. Power consumption can be reduced. A moving image that moves fast can be displayed smoothly. A photograph and the like can be displayed in a large number of gray levels. Consequently, a novel display panel that is highly convenient or reliable can be provided.

<<Structure Example 2 of Pixel Circuit 702(*i*, *j*)>>

The display region 231 includes a plurality of pixels. For example, pixels having a function of displaying colors with different hues can be used for the display region 231. Colors with hues that cannot be represented by each of the plurality of pixels can be represented by additive color mixing with the use of the plurality of pixels.

Note that when a plurality of pixels capable of representing colors with different hues are used for color mixture, each of the pixels can be referred to as a subpixel. In addition, a set of subpixels can be referred to as a pixel.

For example, the pixel 702(*i*, *j*) can be referred to as a subpixel, and the pixel 702(*i*, *j*), the pixel 702(*i*, *j*+1), and the pixel 702(*i*, *j*+2) can be collectively referred to as a pixel 703(*i*, *k*) (see FIG. 4C).

Specifically, a subpixel that represents blue, a subpixel that represents green, and a subpixel that represents red can be collectively used as the pixel 703(*i*, *k*). Alternatively, a subpixel that represents cyan, a subpixel that represents magenta, and a subpixel that represents yellow can be collectively used as the pixel 703(*i*, *k*).

Alternatively, for example, the above set to which a subpixel that represents white or the like is added can be used as the pixel.

<Structure Example 7 of Display Panel>

The display panel 700 includes a substrate 510, a substrate 770, and an insulating film 501C (see FIG. 6A).

The insulating film 501C includes a region between the substrate 510 and the substrate 770. The functional layer 520 includes a region between the insulating film 501C and the substrate 770.

<<Structure Example of Functional Layer 520>>

The functional layer 520 includes an insulating film 521. The insulating film 521 includes an insulating film 521A and an insulating film 521B.

<<Insulating Film 521>>

For example, an insulating inorganic material, an insulating organic material, or an insulating composite material including an inorganic material and an organic material can be used for the insulating film 521.

Specifically, an inorganic oxide film, an inorganic nitride film, an inorganic oxynitride film, and the like, or a layered material obtained by stacking some of these films can be used for the insulating film 521.

For example, a film including any of a silicon oxide film, a silicon nitride film, a silicon oxynitride film, and an aluminum oxide film, and the like, or a film including a material obtained by stacking any of these films can be used for the insulating film 521. Note that the silicon nitride film is a dense film and has an excellent function of suppressing diffusion of impurities.

For example, polyester, polyolefin, polyamide, polyimide, polycarbonate, polysiloxane, an acrylic resin, or a layered or composite material including resins selected from these, or the like can be used for the insulating film 521. Alternatively, a photosensitive material may be used. Thus, with the insulating film 521, steps due to various components overlapping with the insulating film 521, for example, can be reduced.

Note that polyimide is excellent in the following properties compared with other organic materials: thermal stability, an insulating property, toughness, a low dielectric constant, a low coefficient of thermal expansion, and high chemical resistance, for example. Accordingly, in particular, polyimide can be suitably used for the insulating film 521 or the like.

For example, a film formed using a photosensitive material can be used as the insulating film 521. Specifically, a film formed using photosensitive polyimide, photosensitive acrylic, or the like can be used as the insulating film 521.

For example, a light-transmitting material can be used for the insulating film 521. Specifically, silicon nitride can be used for the insulating film 521.

For example, a material that transmits blue light, green light, or red light can be used for the insulating film 521. Specifically, a resin including a coloring material can be used for the insulating film 521. For example, an acrylic resin or the like including a dye or a pigment can be used for the insulating film 521. Thus, the spectral width of light transmitted through the insulating film 521 can be narrowed. The insulating film 521 can be used as a color filter, for example. A backplane with a color filter on array structure can be provided.

<<Functional Layer 720>>

The functional layer 720 includes a coloring film CF, an insulating film 771, and a light-blocking film BM.

The coloring film CF includes a region sandwiched between the substrate 770 and the display element 750(*i, j*).

The light-blocking film BM has an opening portion in a region overlapping with the pixel 702(*i, j*).

The insulating film 771 includes a region sandwiched between the coloring film CF and the layer 753 including a liquid crystal material or a region sandwiched between the light-blocking film BM and the layer 753 including a liquid crystal material. Thus, unevenness due to the thickness of the coloring film CF can be reduced. Furthermore, impurities can be prevented from diffusing from the light-blocking film BM, the coloring film CF, or the like to the layer 753 including a liquid crystal material.

<<Functional Films 770P and 770D and the Like>>

A functional film 770P includes a region overlapping with the display element 750(*i, j*). A functional film 770D also includes a region overlapping with the display element 750(*i,j*).

For example, an anti-reflection film, a polarizing film, a retardation film, a light diffusion film, a condensing film, or the like can be used for the functional film 770P or the functional film 770D.

Specifically, a circularly polarizing film can be used for the functional film 770P. Furthermore, a light diffusion film can be used for the functional film 770D.

Furthermore, an antistatic film preventing the attachment of a foreign substance, a water repellent film preventing stains, an antireflection film, an anti-glare (non-glare) film, a hard coat film suppressing a scratch in use, or the like can be used for the functional film 770P.

Note that this embodiment can be combined with any of the other embodiments in this specification as appropriate.

Embodiment 3

In this embodiment, structures of a display device of one embodiment of the present invention are described with reference to FIGS. 7A, 7B1, 7B2, and 7B3.

FIGS. 7A, 7B1, 7B2, and 7B3 illustrate structures of a display device of one embodiment of the present invention. FIG. 7A is a block diagram of the display device of one embodiment of the present invention. FIGS. 7B1, 7B2, and 7B3 are perspective views illustrating structures of the display device of one embodiment of the present invention.

<Structure Example of Display Device>

The display device described in this embodiment includes a control portion 238 and the display panel 700 (see FIG. 7A).

<<Structure Example of Control Portion 238>>

The control portion 238 receives image data V1 and control data CI.

The control portion 238 generates the data V11 on the basis of the image data V1 and supplies the data V11. The data V11 includes a gray scale of 8 bits or more, preferably 12 bits or more, for example.

Specifically, the control portion 238 includes a decompression circuit 234 and an image processing circuit 235.

<<Decompression Circuit 234>>

The decompression circuit 234 has a function of decompressing the image data V1 which is supplied in a compressed state. The decompression circuit 234 includes a memory portion. The memory portion has a function of storing decompressed image data, for example.

<<Image Processing Circuit 235>>

The image processing circuit 235 includes a memory region, for example. The memory region has a function of storing data included in the image data V1, for example.

The image processing circuit 235 has a function of generating the data V11 by correcting the image data V1 on the basis of a predetermined characteristic curve and a function of supplying the data V11, for example.

<Structure Example of Display Panel>

The display panel 700 receives the data V11. The pixel 702(*i, j*) performs display on the basis of the data V11.

For example, the display panel described in Embodiment 1 can be used.

For example, driver circuits GDA(1), GDB(1), GDA(2), and GDB(2) each have a function of supplying a selection signal on the basis of the control signal SP.

For example, driver circuits SDA(1), SDB(1), SDC(1), SDA(2), SDB(2), and SDC(2) each receive the control signal SP and supply the data V11.

Thus, the image data can be displayed using the display element. Consequently, a novel display device that is highly convenient or reliable can be provided. For example, a television receiver system (see FIG. 7B1), a video monitor (see FIG. 7B2), a laptop computer (see FIG. 7B3), or the like can be provided.

Note that this embodiment can be combined with any of the other embodiments in this specification as appropriate.

Embodiment 4

In this embodiment, a structure of an input/output device of one embodiment of the present invention is described with reference to FIG. 8.

Figure 8:
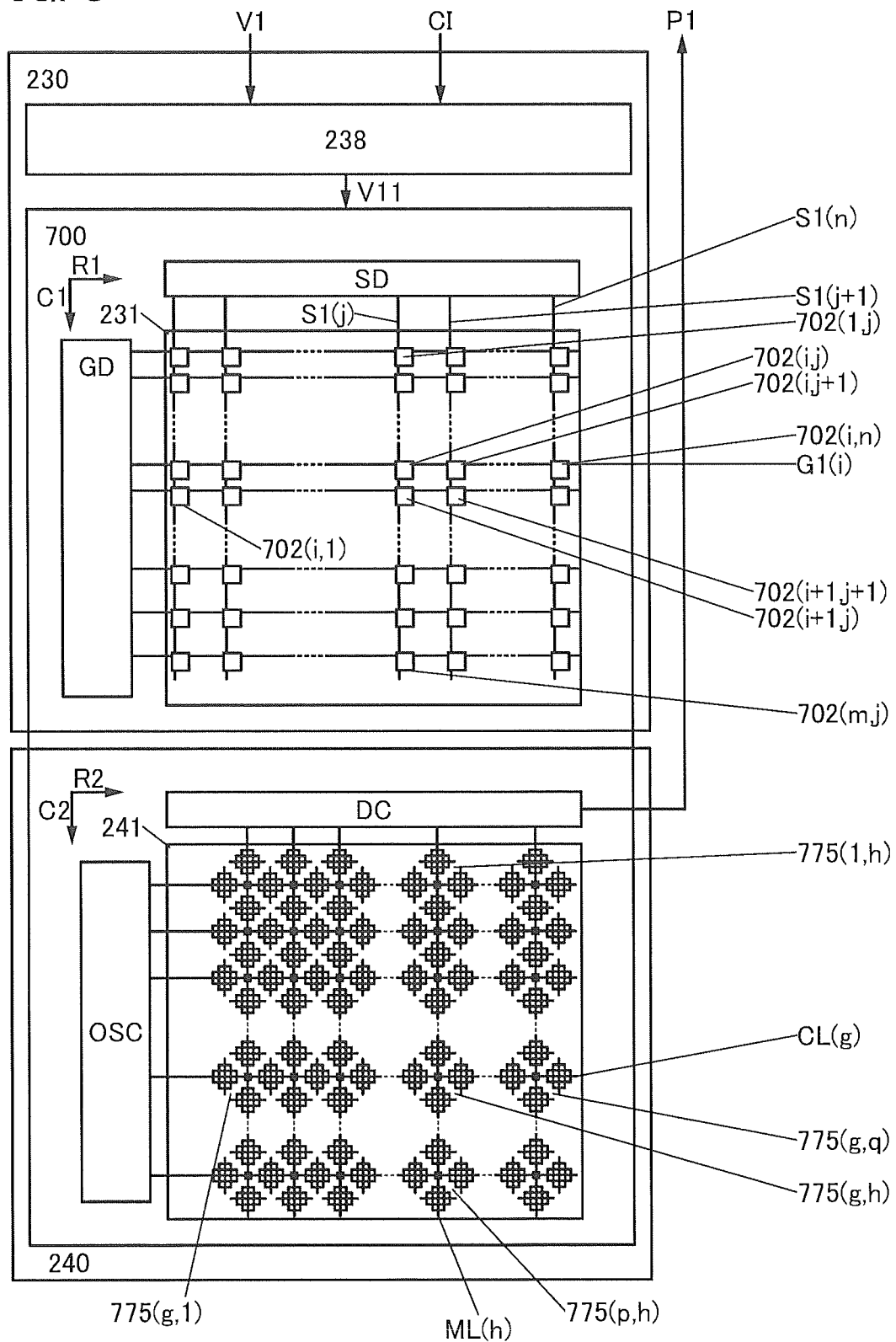
FIG. 8 is a block diagram illustrating a structure of an input/output device of an embodiment.

FIG. 8 is a block diagram illustrating the structure of the input/output device of one embodiment of the present invention.

<Structure Example of Input/Output Device>

The input/output device described in this embodiment includes an input portion 240 and a display portion 230 (see FIG. 8).

<<The Display Portion 230>>

For example, the display panel 700 described in Embodiment 1 can be used for the display portion 230. Note that a panel having a structure including the input portion 240 and the display portion 230 can be referred to as an input/output panel 700TP.

<<Input Portion 240>>

The input portion 240 includes a sensing region 241. The input portion 240 has a function of sensing an object approaching the sensing region 241.

The sensing region 241 includes a region overlapping with the pixel 702($i$, $j$).

The input portion 240 can include an oscillation circuit OSC and a sensing circuit DC (see FIG. 8).

<<Sensing Region 241>>

The sensing region 241 can include one or more sensing elements, for example.

The sensing region 241 includes the one group of sensing elements 775($g$, 1) to 775($g$, $q$) and another group of sensing elements 775(1, h) to 775($p$, h). Note that g is an integer greater than or equal to 1 and less than or equal to p, h is an integer greater than or equal to 1 and less than or equal to q, and each of p and q is an integer greater than or equal to 1.

The one group of sensing elements 775($g$, 1) to 775($g$, $q$) include the sensing element 775($g$, h) and are arranged in the row direction (indicated by the arrow R2 in the drawing).

Note that the direction indicated by the arrow R2 may be the same as or different from the direction indicated by the arrow R1.

The group of sensing elements 775(1, h) to 775($p$, h) include the sensing element 775($g$, h) and are arranged in the column direction (the direction indicated by the arrow C2 in the drawing) which intersects the row direction.

<<Sensing Element>>

The sensing element has a function of sensing an approaching pointer. For example, a finger, a stylus pen, or the like can be used for the pointer. For example, a piece of metal, a coil, or the like can be used for the stylus pen.

Specifically, a capacitive proximity sensor, an electromagnetic inductive proximity sensor, an optical proximity sensor, a resistive proximity sensor, or the like can be used as the sensing element.

Alternatively, a plurality of kinds of sensing elements can be used in combination. For example, a sensing element that senses a finger and a sensing element that senses a stylus pen can be used in combination.

This allows determination of the kind of a pointer. An instruction can also be associated with sensing data depending on the kind of a pointer. Specifically, in the case where it is determined that a finger is used as a pointer, sensing data can be associated with a gesture. In the case where it is determined that a stylus pen is used as a pointer, sensing data can be associated with drawing processing.

Specifically, a capacitive proximity sensor or an optical proximity sensor can be used to sense a finger. An electromagnetic inductive proximity sensor or an optical proximity sensor can be used to sense a stylus pen.

Note that this embodiment can be combined with any of the other embodiments in this specification as appropriate.

Embodiment 5

In this embodiment, a structure of a data processing device of one embodiment of the present invention is described with reference to FIGS. 9A to 9C, FIGS. 10A and 10B, FIGS. 11A to 11C, and FIGS. 12A to 12C.

Figure 9A:
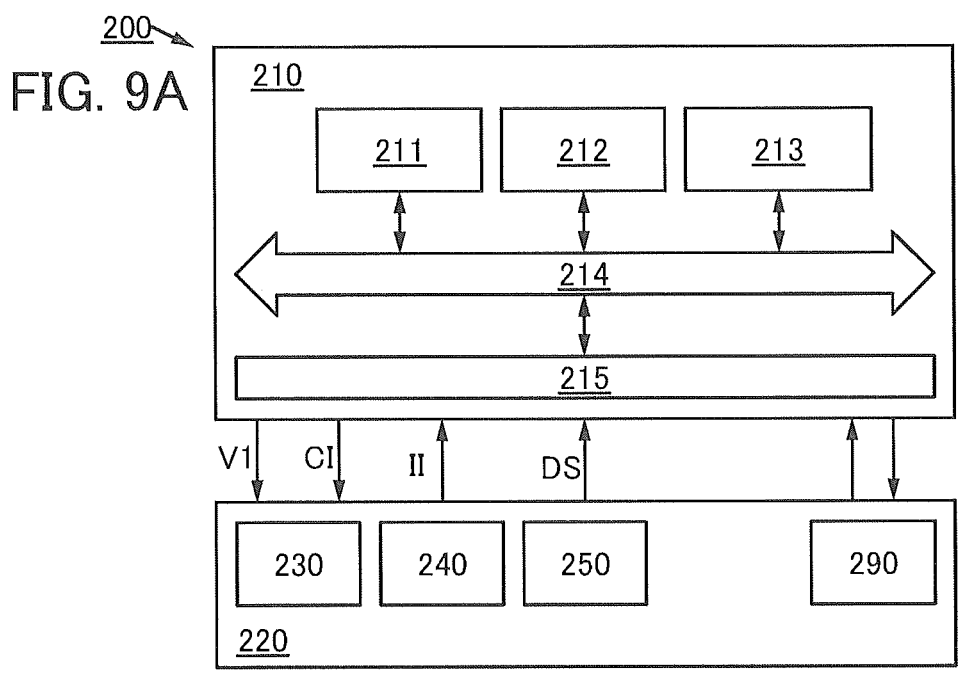
FIGS. 9A to 9C are a block diagram and projection views illustrating structures of a data processing device of an embodiment.
Figure 9B:
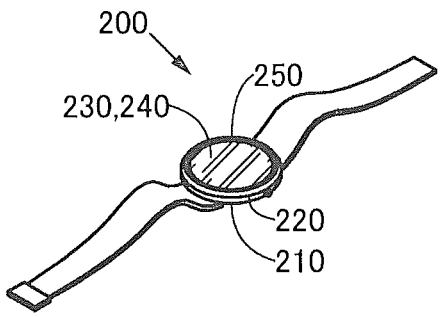
Figure 9C:
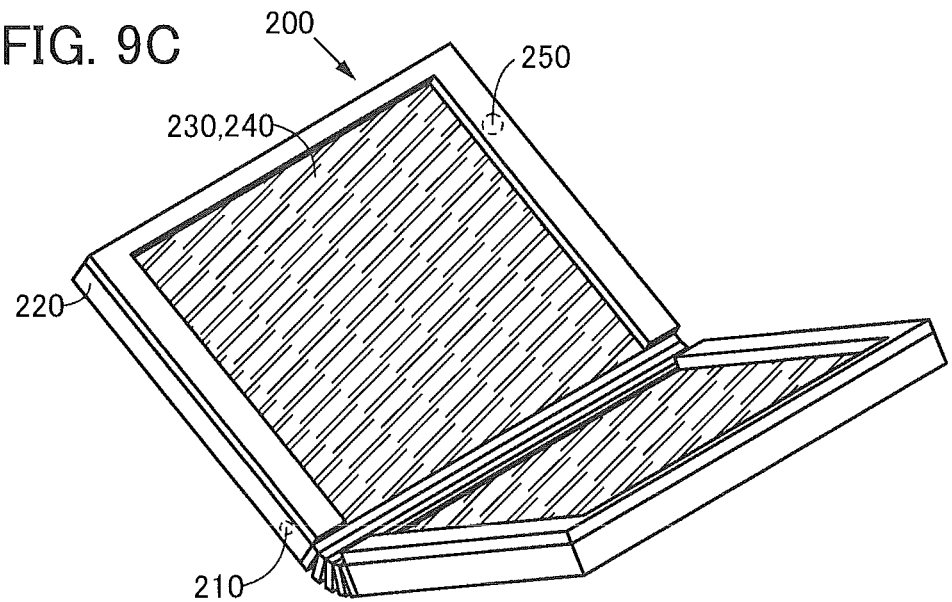

FIG. 9A is a block diagram illustrating a structure of the data processing device of one embodiment of the present invention. FIGS. 9B and 9C are projection views each illustrating an example of an external view of the data processing device.

Figure 10A:
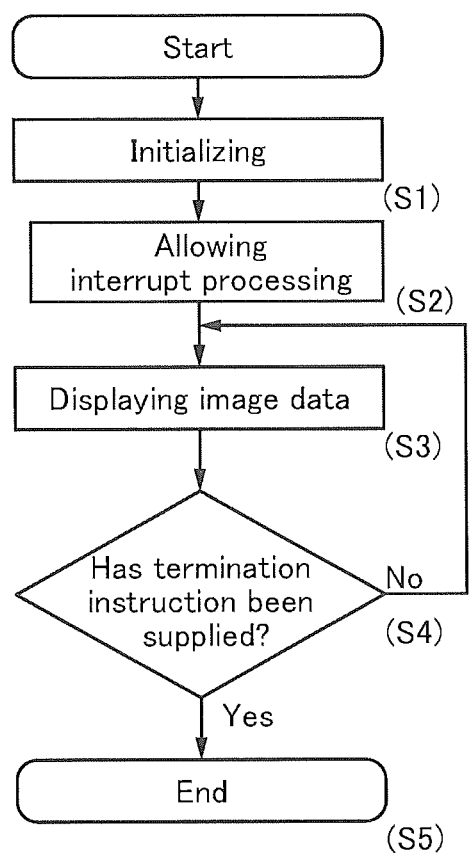
FIGS. 10A and 10B are flow charts illustrating a method of driving a data processing device of an embodiment.
Figure 10B:
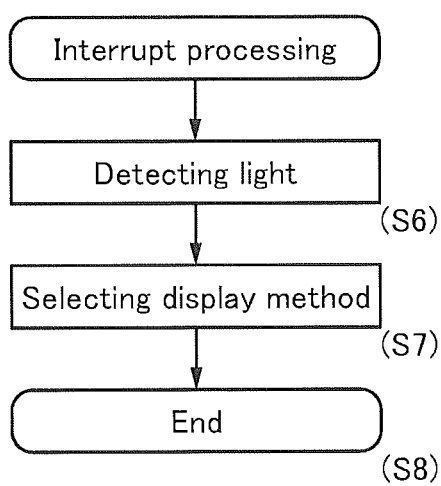

FIGS. 10A and 10B are flow charts illustrating a program of one embodiment of the present invention. FIG. 10A is a flow chart illustrating main processing of the program of one embodiment of the present invention. FIG. 10B is a flow chart illustrating interrupt processing.

Figure 11A:
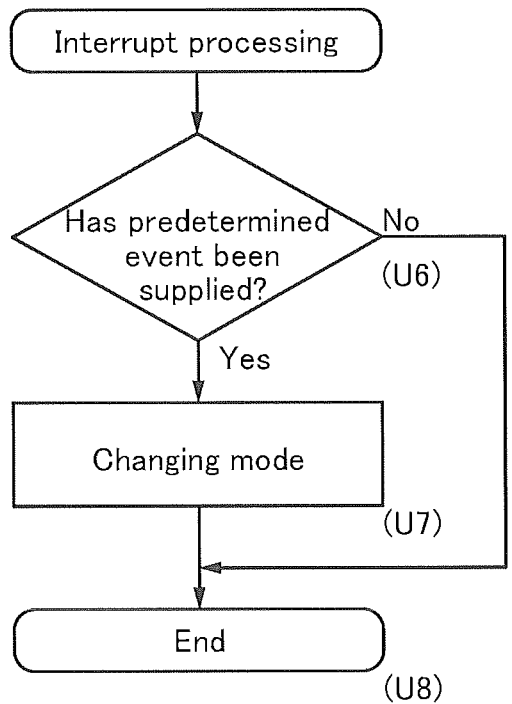
FIGS. 11A to 11C illustrate a method of driving a data processing device of an embodiment.
Figure 11B:
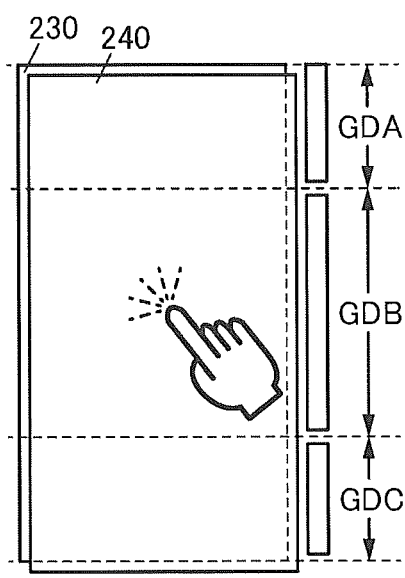
Figure 11C:
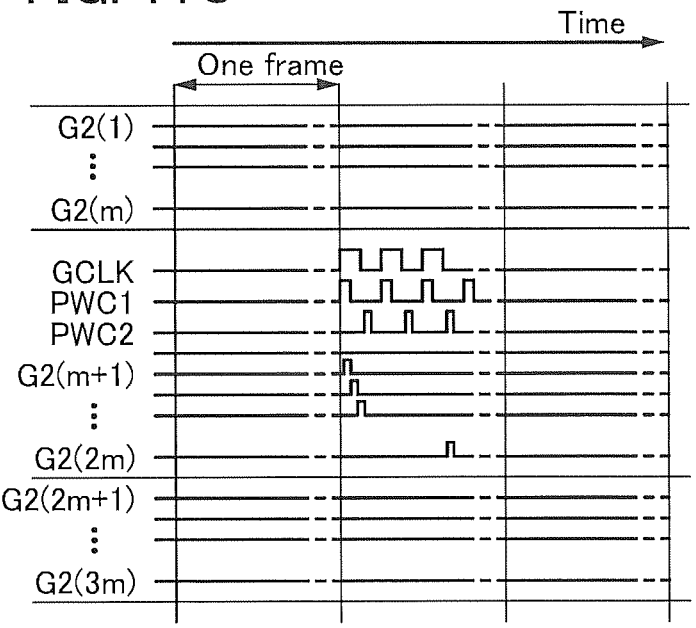

FIGS. 11A to 11C illustrate the program of one embodiment of the present invention. FIG. 11A is a flow chart illustrating interrupt processing of the program of one embodiment of the present invention. FIG. 11B is a schematic view illustrating actuation of the data processing device and FIG. 11C is a timing chart illustrating operation of the data processing device of one embodiment of the present invention.

Figure 12A:
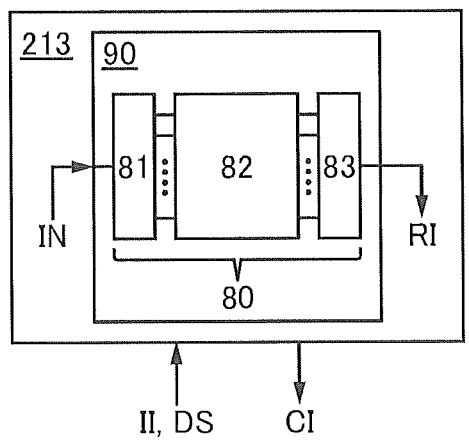
FIGS. 12A to 12C illustrate an artificial intelligence portion of a data processing device of an embodiment.
Figure 12B:
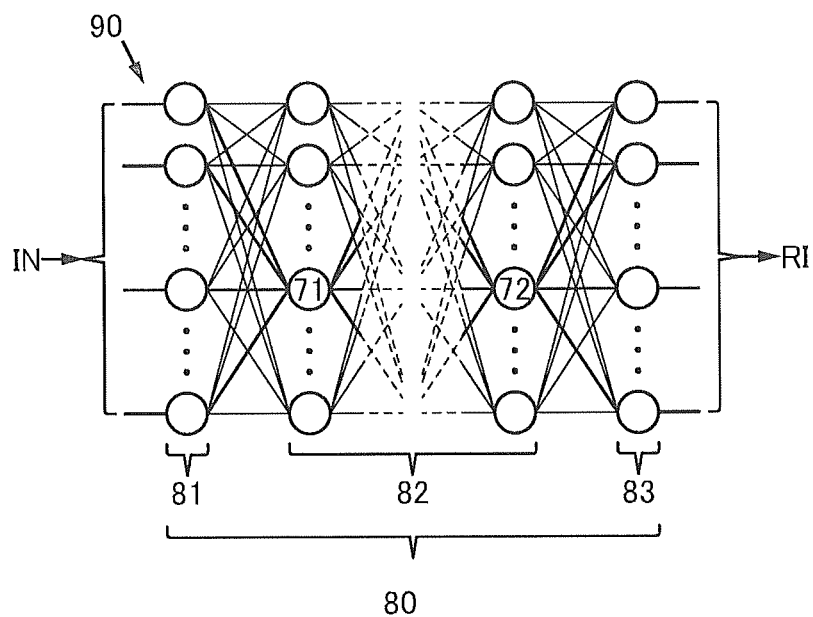
Figure 12C:
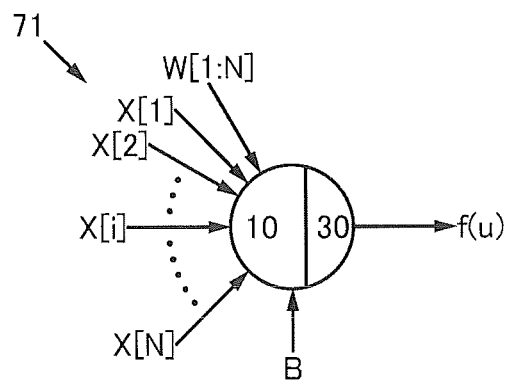

FIG. 12A is a block diagram illustrating an artificial intelligence portion of one embodiment of the present invention, FIG. 12B illustrates a neural network, and FIG. 12C is a block diagram illustrating a neuron circuit of one embodiment of the present invention.

<Structure Example 1 of Data Processing Device>

The data processing device described in this embodiment includes an arithmetic device 210 and an input/output device 220 (see FIG. 9A). Note that the input/output device 220 is electrically connected to the arithmetic device 210. Furthermore, the data processing device 200 can include a housing (see FIG. 9B or FIG. 9C).

<<Structure Example 1 of Arithmetic Device 210>>

The arithmetic device 210 receives input data II or sensing data DS. The arithmetic device 210 supplies the control data CI and the image data V1.

The arithmetic device 210 includes an arithmetic portion 211 and a memory portion 212. The arithmetic device 210 also includes a transmission path 214 and an input/output interface 215.

The transmission path 214 is electrically connected to the arithmetic portion 211, the memory portion 212, and the input/output interface 215.

<<Arithmetic Portion 211>>

The arithmetic portion 211 has a function of executing a program, for example.

<<Memory Portion 212>>

The memory portion 212 has a function of, for example, storing a program executed by the arithmetic portion 211, initial data, setting data, an image, or the like.

Specifically, a hard disk, a flash memory, a memory including a transistor including an oxide semiconductor, or the like can be used.

<<Input/Output Interface 215 and Transmission Path 214>>

The input/output interface 215 includes a terminal or a wiring and has a function of supplying and receiving data. For example, the input/output interface 215 can be electrically connected to the transmission path 214. The input/output interface 215 can also be electrically connected to the input/output device 220.

The transmission path 214 includes a wiring and has a function of supplying and receiving data. For example, the transmission path 214 can be electrically connected to the input/output interface 215. In addition, the transmission path 214 can be electrically connected to the arithmetic portion 211, the memory portion 212, or the input/output interface 215.

<<Structure Example of Input/Output Device 220>>

The input/output device 220 supplies the input data II and the sensing data DS and receives the control data CI and the image data V1 (see FIG. 9A).

As the input data II, for example, a scan cord of a keyboard, positional data, actuation data of buttons, sound data, image data, or the like can be used. For example, illuminance data, attitude data, acceleration data, bearing data, pressure data, temperature data, humidity data, or the like of an environment where the data processing device 200 is used or the like can be used as the sensing data DS.

As the control data CI, for example, a signal controlling the luminance of display of the image data V1, a signal controlling the color saturation of display of the image data V1, or a signal controlling the hue of display of the image data V1 can be used. A signal that changes display of part of the image data V1 can also be used as the control data CI.

The input/output device 220 includes the display portion 230, the input portion 240, a sensing portion 250, and a communication portion 290. For example, the input/output device described in Embodiment 4 can be used.

The display portion 230 displays the image data V1 on the basis of the control data CI.

The input portion 240 generates the input data II.

The sensing portion 250 generates the sensing data DS.

<<Display Portion 230>>

The display portion 230 has a function of displaying an image on the basis of the image data V1. The display portion 230 has a function of displaying an image on the basis of the control data CI.

The display portion 230 includes the control portion 238, the driver circuit GD1, the driver circuit SD1, and the display panel 700 (see FIGS. 7A, 7B1, 7B2, and 7B3). For example, the display device described in Embodiment 3 can be used for the display portion 230.

<<Input Portion 240>>

The input portion 240 has a function of supplying the positional data P1. Any of a variety of human interfaces or the like can be used as the input portion 240.

For example, a keyboard, a mouse, a touch sensor, a microphone, a camera, or the like can be used as the input portion 240. Note that a touch sensor having a region overlapping with the display portion 230 can be used. An input/output device that includes the display portion 230 and a touch sensor having a region overlapping with the display portion 230 can be referred to as a touch panel or a touch screen.

For example, a user can make various gestures (e.g., tap, drag, swipe, and pinch in) using his/her finger as a pointer on the touch panel.

The arithmetic device 210, for example, analyzes data on the position, track, or the like of the finger on the touch panel and determines that a specific gesture is supplied when the analysis results meet predetermined conditions. Therefore, the user can supply a certain actuation instruction associated with a predetermined gesture by using the gesture.

For instance, the user can supply a "scrolling instruction" for changing a portion where image data is displayed by using a gesture of touching and moving his/her finger on the touch panel.

<<Sensing Portion 250>>

The sensing portion 250 has a function of supplying the sensing data DS. The sensing portion 250 has a function of sensing the illuminance of the environment where the data processing device 200 is used and a function of supplying illuminance data, for example.

The sensing portion 250 has a function of sensing the ambient conditions and supplying the sensing data. Specifically, the sensing portion 250 can supply illuminance data, attitude data, acceleration data, bearing data, pressure data, temperature data, humidity data, or the like.

For example, a photosensor, an attitude sensor, an acceleration sensor, a direction sensor, a global positioning system (GPS) signal receiving circuit, a pressure sensor, a temperature sensor, a humidity sensor, a camera, or the like can be used for the sensing portion 250.

<<Communication Portion 290>>

The communication portion 290 has a function of supplying and acquiring data to/from a network.

<<Housing>>

Note that the housing has a function of housing the input/output device 220 or the arithmetic device 210. Alternatively, the housing has a function of supporting the display portion 230 or the arithmetic device 210.

Thus, the data processing device can determine the intensity of light received by the housing of the data processing device and operate in a usage environment. Alternatively, a user of the data processing device can select a display method. Consequently, a novel data processing device that is highly convenient or reliable can be provided.

Note that these components cannot be clearly distinguished from each other and one component may also serve as another component or include part of another component. For example, a touch panel in which a touch sensor is provided to overlap with a display panel serves as an input portion as well as a display portion.

<<Structure Example 2 of Arithmetic Device 210>>

The arithmetic device 210 includes an artificial intelligence portion 213 (see FIG. 9A).

<<Structure Example 1 of Artificial Intelligence Portion 213>>

The artificial intelligence portion 213 generates the control data CI on the basis of the input data II or the sensing data DS (see FIG. 12A).

The artificial intelligence portion 213 includes a semiconductor device 90.

[Natural Language Processing on Input Data II]

Specifically, the artificial intelligence portion 213 can perform natural language processing on the input data II to extract one feature from the whole input data II. For example, the artificial intelligence portion 213 can infer emotion or the like in the input data II and extract the emotion or the like as a feature. The artificial intelligence portion 213 can also infer the color, design, font, or the like empirically felt suitable for the feature. The artificial intelligence portion 213 can also generate data specifying the color, design, or font of a letter or data specifying the color or design of the background, and the data can be used as the control data CI.

Specifically, the artificial intelligence portion 213 can perform natural language processing on the input data II to extract some words included in the input data II. For example, the artificial intelligence portion 213 can extract expressions including a grammatical error, a factual error, emotion, or the like. The artificial intelligence portion 213 can also generate the control data CI for display of extracted part in the color, design, font, or the like different from those of other part so that the control data CI can be used.

[Image Processing on Input Data II]

Specifically, the artificial intelligence portion 213 can perform natural language processing on the input data II to extract one feature from the input data II. For example, the artificial intelligence portion 213 can infer the age where an image of the input data II is taken, whether the image is taken indoors or outdoors, whether the image is taken in the daytime or at night, or the like, which can be extracted as a feature. The artificial intelligence portion 213 can also infer the color tone empirically felt suitable for the feature and generate the control data CI for use of the color tone for display. Specifically, data specifying color (e.g., full color, monochrome, or sepia) used for expression of a gradation can be used as the control data CI.

Specifically, the artificial intelligence portion 213 can perform image processing on the input data II to extract some images included in the input data II. For example, the artificial intelligence portion 213 can generate the control data CI for display of a boundary between extracted part of the image and another extracted part. Specifically, the artificial intelligence portion 213 can generate the control data CI for display of a rectangle surrounding the extracted part of the image.

[Inference Using Sensing Data DS]

Specifically, the artificial intelligence portion 213 can generate an inference RI with the use of the sensing data DS as the data IN. The artificial intelligence portion 213 can generate the control data CI on the basis of the inference RI so that the user of the data processing device 200 can feel comfortable.

Specifically, the artificial intelligence portion 213 can generate the control data CI for adjustment of display brightness on the basis of the ambient illuminance or the like to provide comfortable display brightness. The artificial intelligence portion 213 can also generate the control data CI for adjustment of volume on the basis of the ambient noise or the like to provide comfortable volume.

As the control data CI, a clock signal, a timing signal, or the like that is supplied to the control portion 238 included in the display portion 230 can be used. A clock signal, a timing signal, or the like that is supplied to a control portion included in the input portion 240 can also be used as the control data CI.

<<Semiconductor Device 90>>

The semiconductor device 90 supplies the control data CI on the basis of the input data II or the sensing data DS.

The semiconductor device 90 receives the data IN and supplies the inference RI (see FIGS. 12A and 12B). For example, the input data II or the sensing data DS can be used as the data IN. For example, the inference RI can be used as the control data CI.

For example, the semiconductor device 90 can extract a feature from the input data II or the sensing data DS. The semiconductor device 90 can generate the control data CI on the basis of the extracted feature.

For example, the semiconductor device 90 can extract part of the input data II or the sensing data DS. The semiconductor device 90 can generate the control data CI so that the extracted part is displayed to be different from other part.

Thus, the control data CI enabling display that can be felt suitable can be generated, or display that can be felt suitable is possible. The control data CI enabling display that can be felt comfortable can be generated, or display that can be felt comfortable is possible. Consequently, a novel data processing device that is highly convenient or reliable can be provided.

<<Structure Example 2 of Semiconductor Device 90>>

The semiconductor device 90 includes a neural network 80 (see FIG. 12A).

<<Neural Network 80>>

The neural network 80 includes an input layer 81, a middle layer 82, and an output layer 83 (see FIG. 12B). For example, a convolutional neural network can be used as the neural network 80. A recurrent neural network can also be used as the neural network 80.

The input layer 81 includes a first group of neuron circuits.

The middle layer 82 includes a second group of neuron circuits.

The output layer 83 includes a third group of neuron circuits.

The second group of neuron circuits includes a first neuron circuit 71 and a second neuron circuit 72.

The first neuron circuit 71 is electrically connected to the first group of neuron circuits.

The second neuron circuit 72 is electrically connected to the third group of neuron circuits.

The first group of neuron circuits receives the data IN. For example, the input data II or the sensing data DS can be used as the data IN.

The third group of neuron circuits supplies the inference RI. For example, the inference RI can be used as the control data CI.

<<First Neuron Circuit 71>>

The first neuron circuit 71 includes a product-sum operation unit 10 and a converter 30 (see FIG. 12C).

<<Product-Sum Operation Unit 10>>

The product-sum operation unit 10 receives a group of input signals X[1] to X[N]. The product-sum operation unit 10 receives a group of weight data W[1] to W[N]. The product-sum operation unit 10 also receives a bias signal B.

By the product-sum operation unit 10, a product-sum signal U is generated on the basis of the bias signal B and the product-sum value of the group of input signals X[1] to X[N] and the group of weight data W[1] to W[N] and supplied.

<<Converter 30>>

The converter 30 is electrically connected to the product-sum operation unit 10. By the converter 30, an output signal f(U) is generated on the basis of the product-sum signal U and supplied.

<Structure Example 3 of Data Processing Device>

Another structure of the data processing device of one embodiment of the present invention is described with reference to FIGS. 10A and 10B.

<<Program>>

The program of one embodiment of the present invention has the following steps (see FIG. 10A).

[First Step]

In a first step, setting is initialized (see S1 in FIG. 10A).

For example, predetermined image data which is to be displayed on start-up and data for determining a predetermined mode of displaying the image data and a predetermined method of displaying the image data are acquired from the memory portion 212. Specifically, one still image data or another moving image data can be used as the predetermined image data. Furthermore, a first mode or a second mode can be used as the predetermined mode.

[Second Step]

In a second step, interrupt processing is allowed (see S2 in FIG. 10A). Note that an arithmetic device allowed to execute the interrupt processing can perform the interrupt processing in parallel with the main processing. The arithmetic device which has returned from the interrupt processing to the main processing can reflect the results of the interrupt processing in the main processing.

The arithmetic device may execute the interrupt processing when a counter has an initial value, and the counter may be set at a value other than the initial value when the arithmetic device returns from the interrupt processing. Thus, the interrupt processing is always ready to be executed after the program is started up.

[Third Step]

In a third step, image data is displayed in a predetermined mode or a predetermined display method selected in the first step or the interrupt processing (see S3 in FIG. 10A). Note that the predetermined mode identifies a mode for displaying the data, and the predetermined display method identifies a method of displaying image data. For example, the image data V1 can be used for data to be displayed.

For example, a method of displaying the image data V1 can be associated with the first mode. Another method of displaying the image data V1 can be associated with the second mode. Thus, a display method can be selected on the basis of the selected mode.

<<First Mode>>

Specifically, a method of supplying selection signals to a scan line at a frequency of 30 Hz or more, preferably 60 Hz or more, and performing display in accordance with the selection signals can be associated with the first mode.

For example, the supply of selection signals at a frequency of 30 Hz or more, preferably 60 Hz or more, enables display of a smooth moving image.

For example, an image is refreshed at a frequency of 30 Hz or more, preferably 60 Hz or more, so that an image smoothly following the user's actuation can be displayed on the data processing device 200 the user actuates.

<<Second Mode>>

Specifically, a method of supplying selection signals to a scan line at a frequency less than 30 Hz, preferably less than 1 Hz, further preferably less than once a minute and performing display in accordance with the selection signals can be associated with the second mode.

The supply of selection signals at a frequency less than 30 Hz, preferably less than 1 Hz, more preferably less than once a minute, can perform display with flickering reduced. Furthermore, power consumption can be reduced.

For example, when the data processing device 200 is used for a clock or watch, the display can be refreshed at a frequency of once a second, once a minute, or the like.

For example, when a light-emitting element is used as the display element, the light-emitting element can be made to emit light in a pulsed manner so as to display image data. Specifically, an organic EL element can be made to emit light in a pulsed manner, and its afterglow can be used for display. The organic EL element has excellent frequency characteristics; thus, time for driving the light-emitting element can be shortened, and thus power consumption can be reduced in some cases. Alternatively, heat generation can be inhibited, and thus the deterioration of the light-emitting element can be suppressed in some cases.

[Fourth Step]

In a fourth step, the next step is determined as follows: a fifth step is selected when a termination instruction has been supplied, whereas the third step is selected when the termination instruction has not been supplied (see S4 in FIG. 10A).

For example, the termination instruction supplied in the interrupt processing can be used to determine the next step.

[Fifth Step]

In the fifth step, the program terminates (see S5 in FIG. 10A).

<<Interrupt Processing>>

The interrupt processing includes sixth to eighth steps described below (see FIG. 10B).

[Sixth Step]

In the sixth step, the illuminance of the environment where the data processing device 200 is used can be sensed using the sensing portion 250, for example (see S6 in FIG. 10B). Note that the color temperature or chromaticity of ambient light may be sensed instead of the illuminance of the environment.

[Seventh Step]

In the seventh step, a display method is determined on the basis of the sensed illuminance data (see S7 in FIG. 10B). For example, a display method is determined such that the brightness of display is not too bright or too dark.

In the case where the color temperature or chromaticity of the ambient light is sensed in the sixth step, the color of display may be adjusted.

[Eighth Step]

In the eighth step, the interrupt processing terminates (see S8 in FIG. 10B).

<Structure Example 3 of Data Processing Device>

Another structure of the data processing device of one embodiment of the present invention is described with reference to FIGS. 11A and 11B.

FIG. 11A is a flow chart illustrating a program of one embodiment of the present invention. The interrupt processing in the flow chart in FIG. 11A is different from that in FIG. 10B.

Note that the structure example 3 of the data processing device is different from the interrupt processing in FIG. 10B in that the interrupt processing includes a step in which a mode is changed on the basis of a supplied predetermined event. The different portion is described in detail below, and the above description is referred to for similar portions.

<<Interrupt Processing>>

The interrupt processing includes sixth to eighth steps described below (see FIG. 11A).

[Sixth Step]

In the sixth step, the processing proceeds to the seventh step when a predetermined event has been supplied, whereas the processing proceeds to the eighth step when the predetermined event has not been supplied (see U6 in FIG. 11A). For example, whether the predetermined event is supplied in a predetermined period or not can be a branch condition. Specifically, the predetermined period can be greater than 0 seconds and less than or equal to 5 seconds, preferably less than or equal to 1 second, more preferably less than or equal to 0.5 seconds, still more preferably less than or equal to 0.1 seconds.

[Seventh Step]

In the seventh step, the mode is changed (see U7 in FIG. 11A). Specifically, the mode is changed from the first mode to the second mode, or the mode is changed from the second mode to the first mode.

For example, it is possible to change the display mode of a region that is part of the display portion 230, or more specifically, the display mode of a region in the display portion 230 including driver circuits GDA, GDB, and GDC, where a selection signal is supplied from one of the driver circuits (see FIG. 11B).

For example, the display mode of the region where a selection signal is supplied from the driver circuit GDB can be changed when a predetermined event is supplied to the input portion 240 in a region overlapping with the region where a selection signal is supplied from the driver circuit GDB (see FIGS. 11B and 11C). Specifically, the frequency of the selection signal supplied from the driver circuit GDB can be changed in accordance with an event supplied to a touch panel with a finger or the like, such as "tap".

A signal GCLK is a clock signal controlling an operation of the driver circuit GDB, and signals PWC1 and PWC2 are pulse width control signals controlling the operation of the driver circuit GDB. The driver circuit GDB supplies selection signals to scan lines G2(m+1) to G2(2m) on the basis of the signals GCLK, PWC1, PWC2, and the like.

Thus, for example, the driver circuit GDB can supply a selection signal without supply of selection signals from the driver circuits GDA and GDC. Furthermore, the display of the region where a selection signal is supplied from the driver circuit GDB can be refreshed without any change in the display of regions where selection signals are supplied from the driver circuits GDA and GDC. Furthermore, power consumed by the driver circuits can be reduced.

[Eighth Step]

In the eighth step, the interrupt processing terminates (see U8 in FIG. 11A). Note that in a period in which the main processing is executed, the interrupt processing may be repeatedly executed.

<<Predetermined Event>>

For example, the following events can be used: events supplied using a pointing device such as a mouse (e.g., "click" and "drag") and events supplied to a touch panel with a finger or the like used as a pointer (e.g., "tap", "drag", and "swipe").

For example, the position of a slide bar pointed by a pointer, the swipe speed, and the drag speed can be used as parameters assigned to an instruction associated with a predetermined event.

For example, data sensed by the sensing portion 250 is compared to a predetermined threshold value, and the compared results can be used for the event.

Specifically, a pressure sensor or the like in contact with a button or the like that can be pushed in a housing can be used as the sensing portion 250.

<<Instruction Associated with Predetermined Event>>

For example, the termination instruction can be associated with a predetermined event.

For example, "page-turning instruction" for switching displayed image data from one to another can be associated with a predetermined event. Note that a parameter determining the page-turning speed or the like when the "page-turning instruction" is executed can be supplied using the predetermined event.

For example, "scroll instruction" for moving the display position of displayed part of image data and displaying another part continuing from that part or the like can be associated with a predetermined event. Note that a parameter determining the moving speed of the display position, or the like, when the "scroll instruction" is executed can be supplied using the predetermined event.

For example, an instruction for setting the display method or an instruction for generating image data can be associated with a predetermined event. Note that a parameter determining the brightness of a generated image can be associated with a predetermined event. Note that a parameter determining the brightness of a generated image may be determined on the basis of ambient brightness sensed by the sensing portion 250.

For example, an instruction for acquiring data distributed via a push service using the communication portion 290 or the like can be associated with a predetermined event.

Note that positional data sensed by the sensing portion 250 may be used for the determination of the presence or absence of a qualification for acquiring data. Specifically, it may be determined that there is a qualification for acquiring data when a user is in a predetermined class room, school, conference room, office, building, or the like. For example, educational materials can be fed from a classroom of a school or a university, so that the data processing device 200 can be used as a schoolbook or the like (see FIG. 9C). Alternatively, materials distributed from a conference room in, for example, a company can be received and used for a conference material.

Note that this embodiment can be combined with any of the other embodiments in this specification as appropriate.

Embodiment 6

In this embodiment, structures of a data processing device of one embodiment of the present invention are described with reference to FIGS. 13A to 13E and FIGS. 14A to 14E.

Figure 13A:
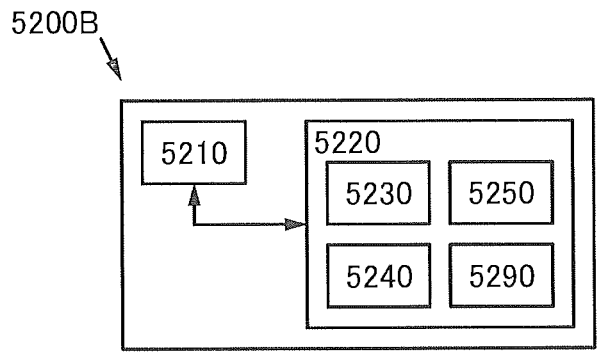
FIGS. 13A to 13E illustrate structures of a data processing device of an embodiment.

FIGS. 13A to 13E and FIGS. 14A to 14E illustrate structures of the data processing device of one embodiment of the present invention. FIG. 13A is a block diagram of the data processing device, and FIGS. 13B to 13E are perspective views each illustrating a structure of the data processing device. FIGS. 14A to 14E are perspective views each illustrating a structure of the data processing device.

<Data Processing Device>

A data processing device 5200B described in this embodiment includes an arithmetic device 5210 and an input/output device 5220 (see FIG. 13A).

The arithmetic device 5210 has a function of receiving actuation data and a function of supplying image data on the basis of the actuation data.

The input/output device 5220 includes a display portion 5230, an input portion 5240, a sensing portion 5250, and a communication portion 5290 and has a function of supplying operation data and a function of receiving image data. The input/output device 5220 also has a function of supplying sensing data, a function of supplying communication data, and a function of receiving communication data.

The input portion 5240 has a function of supplying actuation data. For example, the input portion 5240 supplies actuation data on the basis of actuation by a user of the data processing device 5200B.

Specifically, a keyboard, a hardware button, a pointing device, a touch sensor, an illuminance sensor, an imaging device, an audio input device, an eye-gaze input device, an attitude sensing device, or the like can be used as the input portion 5240.

The display portion 5230 includes a display panel and has a function of displaying image data. For example, the display panel described in Embodiment 1 or Embodiment 2 can be used for the display portion 5230.

The sensing portion 5250 has a function of supplying sensing data. For example, the sensing portion 5250 has a function of sensing a surrounding environment where the data processing device is used and supplying sensing data.

Specifically, an illuminance sensor, an imaging device, an attitude sensing device, a pressure sensor, a human motion sensor, or the like can be used as the sensing portion 5250.

The communication portion 5290 has a function of receiving and supplying communication data. For example, the communication portion 5290 has a function of being connected to another electronic device or a communication network through wireless communication or wired communication. Specifically, the communication portion 5290 has a function of wireless local area network communication, telephone communication, or near field communication, for example.

<<Structure Example 1 of Data Processing Device>>

Figure 13B:
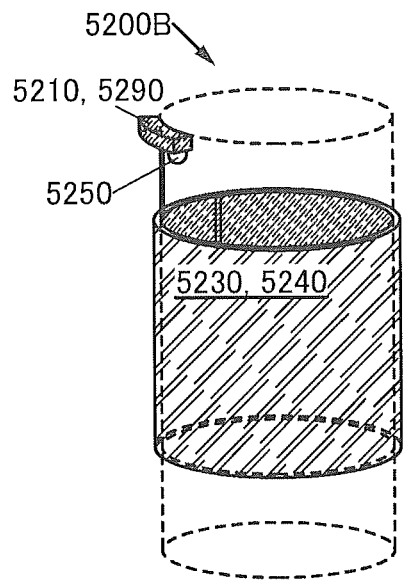

For example, the display portion 5230 can have an outer shape along a cylindrical column (see FIG. 13B). The data processing device has a function of changing its display method in accordance with the illuminance of a usage environment. In addition, the data processing device has a function of changing the displayed content in response to sensed existence of a person. This allows the data processing device to be provided on a column of a building, for example. The data processing device can display advertising, guidance, or the like. The data processing device can be used for digital signage or the like.

<<Structure Example 2 of Data Processing Device>>

Figure 13C:
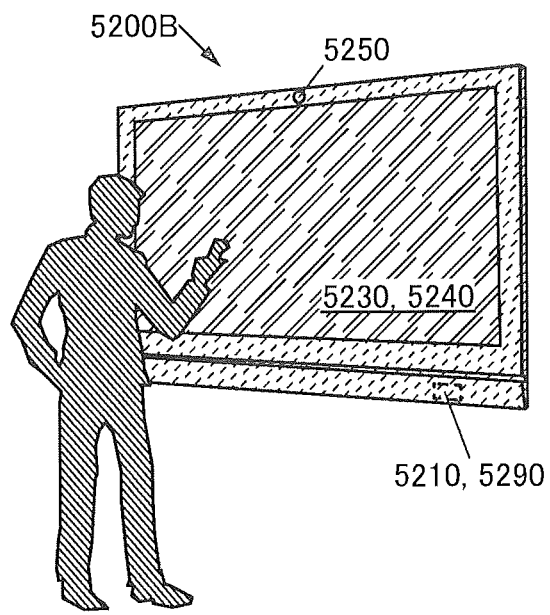

For example, the data processing device has a function of generating image data on the basis of the path of a pointer used by a user (see FIG. 13C). Specifically, the display panel with a diagonal size of 20 inches or longer, preferably 40 inches or longer, further preferably 55 inches or longer can be used. Alternatively, a plurality of display panels can be arranged in one display region. Alternatively, a plurality of display panels can be arranged and used as a multiscreen. Thus, the data processing device can be used for an electronic blackboard, an electronic bulletin board, or digital signage, for example.

<<Structure Example 3 of Data Processing Device>>

Figure 13D:
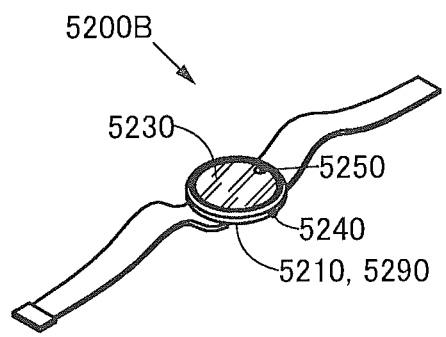

For example, the data processing device has a function of changing its display method in accordance with the illuminance of a usage environment (see FIG. 13D). Thus, it is possible to obtain a smartwatch with reduced power consumption, for example. Alternatively, for example, it is possible to obtain a smartwatch that can display an image such that the smartwatch can be suitably used in an environment under strong external light, e.g., outdoors in fine weather.

<<Structure Example 4 of Data Processing Device>>

Figure 13E:
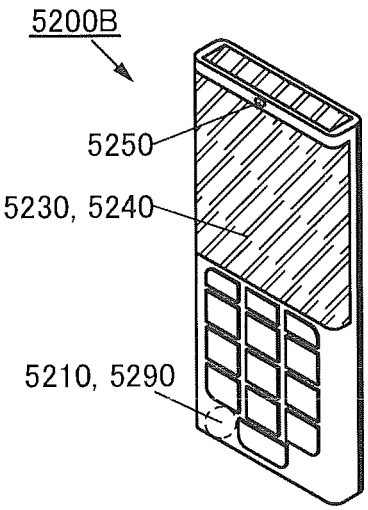

For example, the display portion 5230 has a surface gently curved along a side surface of a housing (see FIG. 13E). The display portion 5230 includes a display panel that can display an image on the front surface, the side surfaces, and the top surface, for example. Thus, it is possible to obtain a mobile phone that can display image data on not only its front surface but also its side surfaces and top surface.

<<Structure Example 5 of Data Processing Device>>

Figure 14A:
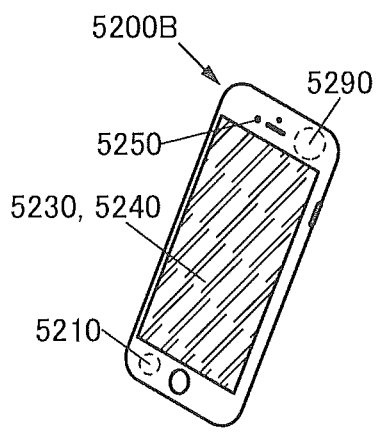
FIGS. 14A to 14E each illustrate a structure of a data processing device of an embodiment.

For example, the data processing device 5200B has a function of changing its display method in accordance with the illuminance of a usage environment (see FIG. 14A). Thus, it is possible to obtain a smartphone with reduced power consumption, for example. Alternatively, for example, it is possible to obtain a smartphone that can display an image such that the smartwatch can be suitably used in an environment under strong external light, e.g., outdoors in fine weather.

<<Structure Example 6 of Data Processing Device>>

Figure 14B:
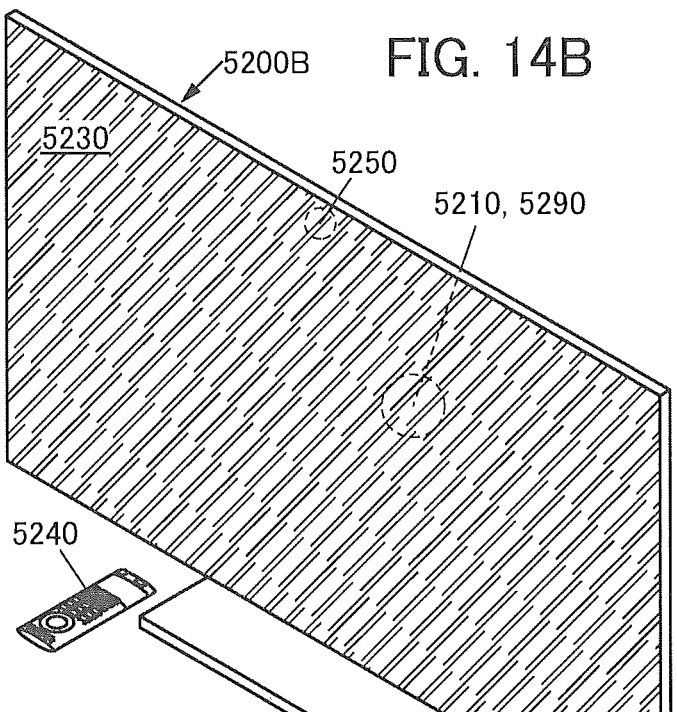

For example, the data processing device 5200B has a function of changing its display method in accordance with the illuminance of a usage environment (see FIG. 14B). Accordingly, for example, it is possible to obtain a television system that can display an image such that the television system can be suitably used even when irradiated with strong external light that enters the room from the outside in fine weather.

<<Structure Example 7 of Data Processing Device>>

Figure 14C:
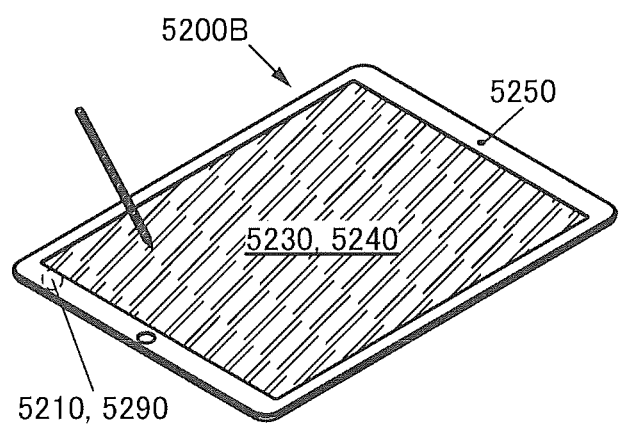

For example, the data processing device 5200B has a function of changing its display method in accordance with the illuminance of a usage environment (see FIG. 14C). Thus, for example, it is possible to obtain a tablet computer that can display an image such that the tablet computer is favorably used in an environment with intense external light, e.g., in the open air under fine weather.

<<Structure Example 8 of Data Processing Device>>

Figure 14D:
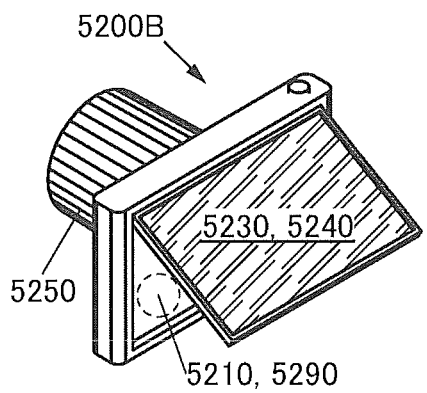

For example, the data processing device has a function of changing its display method in accordance with the illuminance of a usage environment (see FIG. 14D). Accordingly, for example, it is possible to obtain a digital camera that can display a subject such that an image is favorably viewed even in an environment with intense external light, e.g., in the open air under fine weather.

<<Structure Example 9 of Data Processing Device>>

Figure 14E:
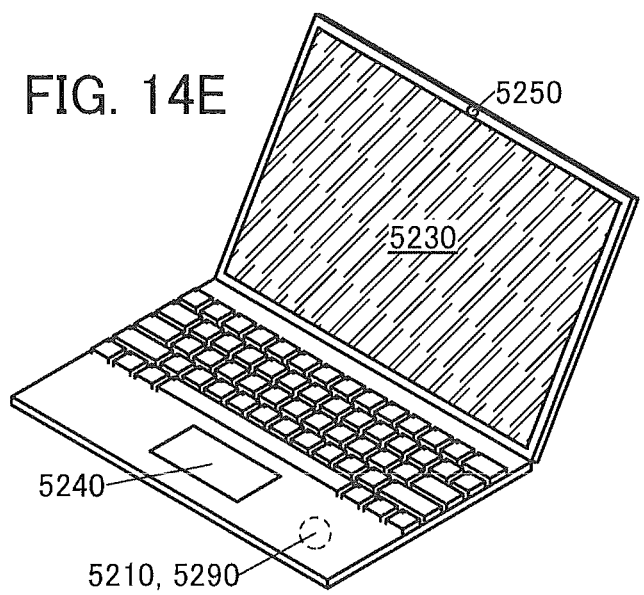

For example, the data processing device 5200B has a function of changing its display method in accordance with the illuminance of a usage environment (see FIG. 14E). Accordingly, for example, it is possible to obtain a personal computer that can display an image such that the personal computer is favorably used even in an environment with intense external light, e.g., in the open air under fine weather.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, and a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected when a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X through at least Z1 on a first connection path, the first connection path does not include a second connection path, the second connection path includes a connection path on which the transistor is present, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

REFERENCE NUMERALS

GDA: driver circuit, GDB: driver circuit, GDC: driver circuit, SDA: driver circuit, SDB: driver circuit, SDC: driver circuit, SP: control signal, CI: control data, DS: sensing data, GCLK: signal, II: input data, IN: data, RI: inference, B: bias signal, f(U): output signal, W: weight data, X: input signal, U: product-sum signal, AF1: alignment film, AF2: alignment film, G1: scan line, G2: scan line, GD1: driver circuit, KB1: structure body, P1: positional data, PWC1: signal, PWC2: signal, S1: signal line, SD1: driver circuit, SW1: switch, T1: period, T2: period, T3: period, T4: period, T5: period, T6: period, T11: period, V1: image data, V11: data, V11(j): signal, V11(j+1): signal, 10: product-sum operation unit, 30: converter, 71: neuron circuit, 72: neuron circuit, 80: neural network, 81: input layer, 82: middle layer, 83: output layer, 90: semiconductor device, 200: data processing device, 210: arithmetic device, 211: arithmetic portion, 212: memory portion, 213: artificial intelligence portion, 214: transmission path, 215: input/output interface, 220: input/output device, 230: display portion, 231: display region, 233: control circuit, 234: decompression circuit, 235: image processing circuit, 238: control portion, 240: input portion, 241: sensing region, 248: control portion, 250: sensing portion, 290: communication portion, 501C: insulating film, 504: conductive film, 506: insulating film, 508: semiconductor film, 508A: region, 508B: region, 508C: region, 510: substrate, 512A: conductive film, 512B: conductive film, 520: functional layer, 521: insulating film, 521A: insulating film, 521B: insulating film, 530: pixel circuit, 591A: opening portion, 700: display panel, 700TP: input/output panel, 702: pixel, 703: pixel, 720: functional layer, 750: display element, 751: electrode, 752: electrode, 753: layer including liquid crystal material, 770: substrate, 770D: functional film, 770P: functional film, 771: insulating film, 775: sensing element, 5200B: data processing device, 5210: arithmetic device, 5220: input/output device, 5230: display portion, 5240: input portion, 5250: sensing portion, 5290: communication portion This application is based on Japanese Patent Application Serial No. 2017-133408 filed with Japan Patent Office on Jul. 7, 2017, the entire contents of which are hereby incorporated by reference.

The invention claimed is:

1. A method for driving a display device, the display device comprising:
   a first driver circuit electrically connected to a first scan line and a second scan line adjacent to the first scan line; and
   a second driver circuit electrically connected to a first signal line and a second signal line adjacent to the first signal line,
   the method comprising:
      in a first period, selecting the first scan line, supplying first data with use of a voltage greater than or equal to a predetermined voltage to the first signal line, and supplying fifth data with use of a voltage less than or equal to the predetermined voltage to the second signal line;
      in a second period after the first period, supplying the predetermined voltage to the first signal line and the second signal line; and
      in a third period after the second period, selecting the second scan line, supplying second data with use of the voltage less than or equal to the predetermined voltage to the first signal line, and supplying sixth data with use of the voltage greater than or equal to the predetermined voltage to the second signal line,
   wherein a length of the second period is less than or equal to twice a length of a period in which the first data is supplied.

2. The method for driving a display device according to claim 1,
   wherein the method further comprises:
      in a fourth period after the third period, selecting the first scan line and supplying third data with use of the voltage less than or equal to the predetermined voltage to the first signal line;
      in a fifth period after the fourth period, supplying the predetermined voltage to the first signal line; and
      in a sixth period after the fifth period, selecting the second scan line and supplying fourth data with use of the voltage greater than or equal to the predetermined voltage to the first signal line.

3. The method for driving a display device according to claim 1, wherein the length of the second period is greater than or equal to 0.5 times and less than or equal to 0.8 times the length of the period in which the first data is supplied.

4. The method for driving a display device according to claim 1,
   wherein the first scan line is selected at a frequency less than or equal to 1 Hz or greater than or equal to 30 Hz, and
   wherein the second scan line is selected at the same frequency as the first scan line.

5. The method for driving a display device according to claim 1, wherein the display device further comprises a control circuit configured to supply a control signal to the second driver circuit.

6. The method for driving a display device according to claim 1,
   wherein the display device further comprises a plurality of pixels, and
   wherein each of the plurality of pixels comprises a liquid crystal element.

7. The method for driving a display device according to claim 1,
   wherein the display device further comprises a plurality of pixels, and
   wherein each of the plurality of pixels comprises a transistor comprising amorphous silicon.

8. A method for driving a display device, the display device comprising:
   a first driver circuit electrically connected to a first scan line and a second scan line adjacent to the first scan line; and
   a second driver circuit electrically connected to a first signal line,
   the method comprising:
      in a first period, selecting the first scan line and supplying first data with use of a voltage greater than or equal to a predetermined voltage to the first signal line;
      in a second period after the first period, supplying the predetermined voltage to the first signal line; and
      in a third period after the second period, selecting the second scan line and supplying second data with use of a voltage less than or equal to the predetermined voltage to the first signal line,
   wherein a length of the second period is less than or equal to twice a length of a period in which the first data is supplied.

9. The method for driving a display device according to claim 8,
   wherein the method further comprises:
      in a fourth period after the third period, selecting the first scan line and supplying third data with use of the voltage less than or equal to the predetermined voltage to the first signal line;
      in a fifth period after the fourth period, supplying the predetermined voltage to the first signal line; and
      in a sixth period after the fifth period, selecting the second scan line and supplying fourth data with use of the voltage greater than or equal to the predetermined voltage to the first signal line.

10. The method for driving a display device according to claim 8, wherein the length of the second period is greater than or equal to 0.5 times and less than or equal to 0.8 times the length of the period in which the first data is supplied.

11. The method for driving a display device according to claim 8,
    wherein the first scan line is selected at a frequency less than or equal to 1 Hz or greater than or equal to 30 Hz, and
    wherein the second scan line is selected at the same frequency as the first scan line.

12. A method for driving a display device, the display device comprising:
    a first driver circuit electrically connected to a first scan line and a second scan line adjacent to the first scan line; and
    a second driver circuit electrically connected to a first signal line and a second signal line adjacent to the first signal line,
    the method comprising:
       in a first period, selecting the first scan line, supplying first data with use of a voltage greater than or equal to a predetermined voltage to the first signal line, and supplying fifth data with use of a voltage less than or equal to the predetermined voltage to the second signal line;

in a second period after the first period, supplying the predetermined voltage to the first signal line and the second signal line; and in a third period after the second period, selecting the second scan line, supplying second data with use of the voltage less than or equal to the predetermined voltage to the first signal line, and supplying sixth data with use of the voltage greater than or equal to the predetermined voltage to the second signal line, wherein a length of the second period is less than or equal to twice a length of a period in which the first data is supplied, wherein the length of the second period is greater than or equal to 0.5 times and less than or equal to 0.8 times the length of the period in which the first data is supplied, wherein the first scan line is selected at a frequency less than or equal to 1 Hz or greater than or equal to 30 Hz, and wherein the second scan line is selected at the same frequency as the first scan line.

13. The method for driving a display device according to claim 12, wherein the method further comprises:

in a fourth period after the third period, selecting the first scan line and supplying third data with use of the voltage less than or equal to the predetermined voltage to the first signal line;

in a fifth period after the fourth period, supplying the predetermined voltage to the first signal line; and in a sixth period after the fifth period, selecting the second scan line and supplying fourth data with use of the voltage greater than or equal to the predetermined voltage to the first signal line.

\* \* \* \* \*